United States Patent
Elanany et al.

(10) Patent No.: US 11,060,042 B2
(45) Date of Patent: Jul. 13, 2021

(54) SUCCINIMIDE-BASED COPOLYMERS AND USE AS HYDRATE INHIBITORS

(71) Applicants: Saudi Arabian Oil Company, Dhahran (SA); King Fahd University of Petroleum and Minerals, Dhahran (SA)

(72) Inventors: Mohamed Elanany, Ras Tanura (SA); Khalid Majnouni, Dhahran (SA); Rashed Alessa, Alkubar (SA); Abdullah Al-Malki, Dhahran (SA); Hassan Al-Ajwad, Dhahran (SA); Mohammed Al-Daous, Dhahran (SA); Shaikh Asrof Ali, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 0 days.

(21) Appl. No.: 16/728,245

(22) Filed: Dec. 27, 2019

(65) Prior Publication Data
US 2020/0148828 A1  May 14, 2020

Related U.S. Application Data

(62) Division of application No. 15/584,389, filed on May 2, 2017, now abandoned.
(Continued)

(51) Int. Cl.
*C10L 1/10* (2006.01)
*C10L 3/10* (2006.01)
(Continued)

(52) U.S. Cl.
CPC ............ *C10L 3/107* (2013.01); *C08G 73/02* (2013.01); *C08G 73/1092* (2013.01); *C08K 5/01* (2013.01);
(Continued)

(58) Field of Classification Search
CPC ..... C10L 3/107; C08G 73/02; C08G 73/1092; C08K 5/01; C08K 5/04; C08K 5/07; C08K 5/16; C08K 5/34; C08K 5/36
See application file for complete search history.

(56) References Cited

U.S. PATENT DOCUMENTS 4,221,888 A   9/1980 Kawakami et al.
4,277,580 A   7/1981 Allen et al.
(Continued)

FOREIGN PATENT DOCUMENTS

CN   104449600 A   3/2015
EP       161882 A2   11/1985
(Continued)

OTHER PUBLICATIONS

Office Action dated Jul. 30, 2020 pertaining to Chinese Patent Application No. 201780027876.7.
(Continued)

*Primary Examiner* — Cephia D Toomer
(74) *Attorney, Agent, or Firm* — Dinsmore & Shohl LLP

(57) ABSTRACT

Copolymers having General Formula (I):

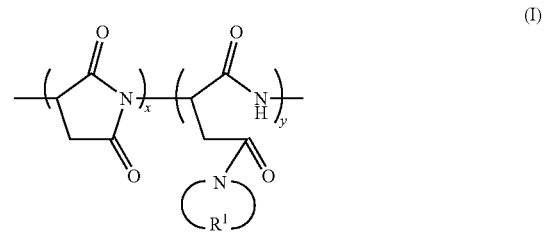

in which $R^1$ is chosen from divalent $C_4$-$C_7$ aliphatic groups and divalent $C_4$-$C_7$ heteroaliphatic groups, optionally sub-
(Continued)

stituted with one or more $C_1$-$C_6$ aliphatic groups, heteroatoms independently chosen from O, N, and S, or combinations thereof, where: the divalent $C_4$-$C_7$ heteroaliphatic groups include one or two heteroatoms independently chosen from O, N, and S, and the maximum number of heteroatoms in $R^1$ is two; x is a molar fraction range chosen from 0.05 to 0.95; and y is a molar fraction range chosen from 0.05 to 0.95, where the summation of x and y equals 1. Methods for inhibiting formation of clathrate hydrates in a fluid capable of forming the clathrate hydrates. The methods include contacting the fluid with at least one copolymer of General Formula (I) under conditions suitable for forming the clathrate hydrates.

12 Claims, 6 Drawing Sheets

Related U.S. Application Data

(60) Provisional application No. 62/332,768, filed on May 6, 2016.

(51) Int. Cl.

| | | |
|---|---|---|
| *C08G 73/02* | (2006.01) | |
| *C08G 73/10* | (2006.01) | |
| *C08K 5/01* | (2006.01) | |
| *C08K 5/04* | (2006.01) | |
| *C08K 5/07* | (2006.01) | |
| *C08K 5/16* | (2006.01) | |
| *C08K 5/34* | (2006.01) | |
| *C08K 5/36* | (2006.01) | |

(52) U.S. Cl.
CPC ............... *C08K 5/04* (2013.01); *C08K 5/07* (2013.01); *C08K 5/16* (2013.01); *C08K 5/34* (2013.01); *C08K 5/36* (2013.01)

(56) References Cited

U.S. PATENT DOCUMENTS

| | | | |
|---|---|---|---|
| 4,363,797 A * | 12/1982 | Jacquet | ........... A61K 8/731 132/203 |
| 4,435,556 A | 3/1984 | Masler | |
| 4,828,710 A | 5/1989 | Itoh et al. | |
| 5,413,731 A | 5/1995 | Adler et al. | |
| 5,432,292 A | 7/1995 | Sloan, Jr. | |
| 5,841,010 A | 11/1998 | Rabeony et al. | |
| 5,883,210 A | 3/1999 | Ahmed et al. | |
| 6,015,929 A | 1/2000 | Rabeony et al. | |
| 6,232,273 B1 | 5/2001 | Namba et al. | |
| 6,319,971 B1 | 11/2001 | Kelland et al. | |
| 6,593,408 B1 | 7/2003 | Takaki et al. | |
| 7,183,240 B2 | 2/2007 | Dahlmann et al. | |
| 7,214,814 B2 | 5/2007 | Dahlmann et al. | |
| 7,297,823 B2 | 11/2007 | Dahlmann et al. | |
| 7,381,689 B2 | 6/2008 | Panchalingam et al. | |
| 7,662,970 B2 | 2/2010 | Rivers et al. | |
| 7,837,746 B2 | 11/2010 | Rivers et al. | |
| 7,893,009 B2 | 2/2011 | Leinweber et al. | |
| 7,968,500 B2 | 6/2011 | Pakulski et al. | |
| 8,034,748 B2 | 10/2011 | Dahlmann et al. | |
| 9,145,465 B2 | 9/2015 | Spencer | |
| 2003/0018152 A1 | 1/2003 | Angel et al. | |
| 2004/0024152 A1 | 2/2004 | Toyama et al. | |
| 2006/0025603 A1 | 2/2006 | Quinlin et al. | |
| 2006/0205603 A1 | 9/2006 | Colle et al. | |
| 2008/0177103 A1 | 7/2008 | Leinweber et al. | |
| 2008/0221271 A1 | 9/2008 | Duggal et al. | |
| 2010/0209476 A1 | 8/2010 | Lim et al. | |
| 2011/0152130 A1 | 6/2011 | Adidharma et al. | |
| 2012/0080643 A1 | 4/2012 | Leinweber et al. | |
| 2013/0098623 A1 * | 4/2013 | Spencer | ........... C08F 220/34 166/310 |
| 2013/0123147 A1 | 5/2013 | Musa et al. | |
| 2013/0261275 A1 | 10/2013 | Musa et al. | |
| 2014/0148337 A1 | 5/2014 | Schnabel et al. | |
| 2015/0322330 A1 | 11/2015 | Spencer et al. | |

FOREIGN PATENT DOCUMENTS

| | | |
|---|---|---|
| EP | 163404 A2 | 12/1985 |
| EP | 256797 A1 | 2/1988 |
| GB | 2301825 A | 12/1996 |
| JP | 11092787 A | 4/1999 |
| JP | 2003137916 A | 5/2003 |
| JP | 3851682 B2 | 11/2006 |
| WO | 9325798 A1 | 12/1993 |
| WO | 9608672 A1 | 3/1996 |
| WO | 9641785 A1 | 12/1996 |
| WO | 9819980 A1 | 5/1998 |

OTHER PUBLICATIONS

Office Action dated Jul. 1, 2020 pertaining to Chinese Patent Application No. 201780027637.1.
International Search Report and Written Opinion dated Aug. 6, 2017 for PCT/U32017/029283 Filed May 30, 2017. pp. 1-18.
International Search Report and Written Opinion dated Jul. 12, 2017 for PCT/US2017/030795 Jul. 30, 2017. pp. 1-10.
International Search Report and Written Opinion dated Jul. 27, 2017 for PCT/US2017/030794 Filed Jul. 20, 2017. pp. 1-9.
Skrabania et al., "Design, Synthesis, and Aqueous Aggregation Behavior of Nonionic Single and Multiple Thermoresponsive Polymers", , Langmuir 2007, vol. 23, Jan. 1, 2007, pp. 84-93.
Yoshino et al., "Temperature Sensitization of Liposomes by Use of N-Isopropylacrylamide Copolymers with Varying Transition Endotherms", Bioconjugate Chem. 2004, Sep. 1, 2004, pp. 1102-1109.
Kono et al., "Thermosensitive polymer-modified liposomes that release contents around physiological temperature", Biochimica et Biophysica Acta, Jan. 1, 1999, pp. 239-250.
"Poly(glycidyl methacrylate): a highly versatile polymeric building block for post-polymerization modifications", Polym. Chem., 2013, 4, 124.
Election/Restriction dated Oct. 26, 2017 for U.S. Appl. No. 15/584,389, filed May 2, 2017.
Office Action dated Mar. 9, 2018 pertaining to U.S. Appl. No. 15/584,389.
International Search Report and Written Opinion dated Sep. 19, 2017 pertaining to International Application No. PCT/US2017030373.
Office Action dated May 10, 2018 pertaining to U.S. Appl. No. 15/584,382, 20 pages.
Election/Restriction dated Feb. 1, 2018 for U.S. Appl. No. 15/584,382, filed May 2, 2017.
Election/Restriction dated May 17, 2018 for U.S. Appl. No. 15/585,558, filed May 3, 2017.
Yoshida et al., "Modulating the phase transition temperature and thermosensitivity in N-isopropylacrylamide copolymer gels", J. Biomater. Sci. Polymer Edn, vol. 6, No. 6, pp. 585-598, 1994.
Election/Restriction Requirement dated Jul. 20, 2018 pertaining to U.S. Appl. No. 15/585,574.
Office Action dated Aug. 1, 2018 pertaining to U.S. Appl. No. 15/585,558.
Office Action pertaining to U.S. Appl. No. 15/585,574 dated Sep. 27, 2018.
Office Action dated Mar. 22, 2019 pertaining to U.S. Appl. No. 15/585,558, 21 pages.
International Preliminary Report on Patentability pertaining to PCT/US2017/030795 dated Nov. 6, 2018.
International Preliminary Report on Patentability pertaining to PCT/US2017/030794 dated Nov. 6, 2018.
International Preliminary Report on Patentability pertaining to PCT/US2017/030373dated Nov. 6, 2018.

(56) References Cited

OTHER PUBLICATIONS

Final Office Action dated Nov. 29, 2018 pertaining to U.S. Appl. No. 15/585,558, 17 pages.
Final Office Action dated Nov. 16, 2018 pertaining to U.S. Appl. No. 15/584,389, 24 pages.
GCC Examination Report dated Feb. 11, 2019 pertaining to GC Application No. 2017-33343 filed May 4, 2017, 4 pgs.
Advisory Action dated May 30, 2019 pertaining to U.S. Appl. No. 15/585,574, filed May 3, 2017, 7 pgs.
U.S. Office Action dated Jun. 27, 2019 pertaining to U.S. Appl. No. 15/584,389, filed May 2, 2017, 33 pgs.
Office Action pertaining to application No. GC 2017-33342 dated Jun. 26, 2019.
Office Action pertaining to U.S. Appl. No. 15/585,558 dated Sep. 20, 2019.
https://en.wikipedia.org/wiki/Thioglycolic_acid downloaded on Sep. 16, 2019.
Notice of Allowance and Fee(s) Due dated Oct. 10, 2019 pertaining to U.S. Appl. No. 15/585,574, filed May 3, 2017, 36 pgs.
Arabiyah & Habash Offshore & Onshore Facilities, Loss Prevention Plan for Fabrication Activities at Karimun Fabrication Yard, 2012, Saudi Aramco.
Examination Report pertaining to Application No. GC 2017-33341 dated Apr. 15, 2019.
Masayuki Tomida et al., "Convenient synthesis of high molecular weight poly(succinimide) by acid-catalysed polycondensation of L-aspartic acid" Polymer, vol. 38, No. 18, 1997, pp. 4733-4736.
Koshi Matsubara et al., "H and C NMR Characterization of Poly(succinimide) Prepared by Thermal Polycondensation of L-Aspartic Acid", Macromolecules, vol. 30, pp. 2305-2315.
Second Examination Report for Application No. 2017/33343 dated Jul. 3, 2019.
Office Action dated Mar. 18, 2019 pertaining to U.S. Appl. No. 5/585,574, 22 pages.
Office Action dated Sep. 30, 2020 pertaining to European Patent Application No. 17723838.3.
Examination Report dated Jan. 10, 2020 pertaining to GCC Patent Application No. 2017/33342.
Office Action dated Mar. 31, 2020 pertaining to U.S. Appl. No. 15/585,558, filed May 3, 2017, 22 pgs.
Office Action dated Jun. 8, 2020 pertaining to European Patent Application No. 17739724.7.
Examination Report dated Jun. 9, 2020 pertaining to GCC Patent Application No. 2017/33341.
Office Action dated Jul. 14, 2020 pertaining to U.S. Appl. No. 15/585,558, filed May 3, 2017, 13 pgs.
Office Action dated Feb. 5, 2021 pertaining to Korean Patent Application No. 10-2018-7035421.
Notice of Allowance and Fee(s) Due dated Mar. 24, 2021 pertaining to U.S. Appl. No. 16/710,842 filed Dec. 11, 2019, 53 pgs.
Ali, S. et al.; Synthesis and evaluation of phosphate-free antiscalants to control CaSO4 2H20 scale formation in reverse osmosis desalination plants; Desalination; 2015, pp. 36-44; vol. 357; Elsevier.
Office Action dated Mar. 1, 2021 pertaining to Chinese Patent Application No. 201780027637.1.
Korean Notice of Preliminary Rejection dated Mar. 30, 2021 pertaining to Korean Patent Application No. 10-2018-7035325, 9 pgs.

\* cited by examiner

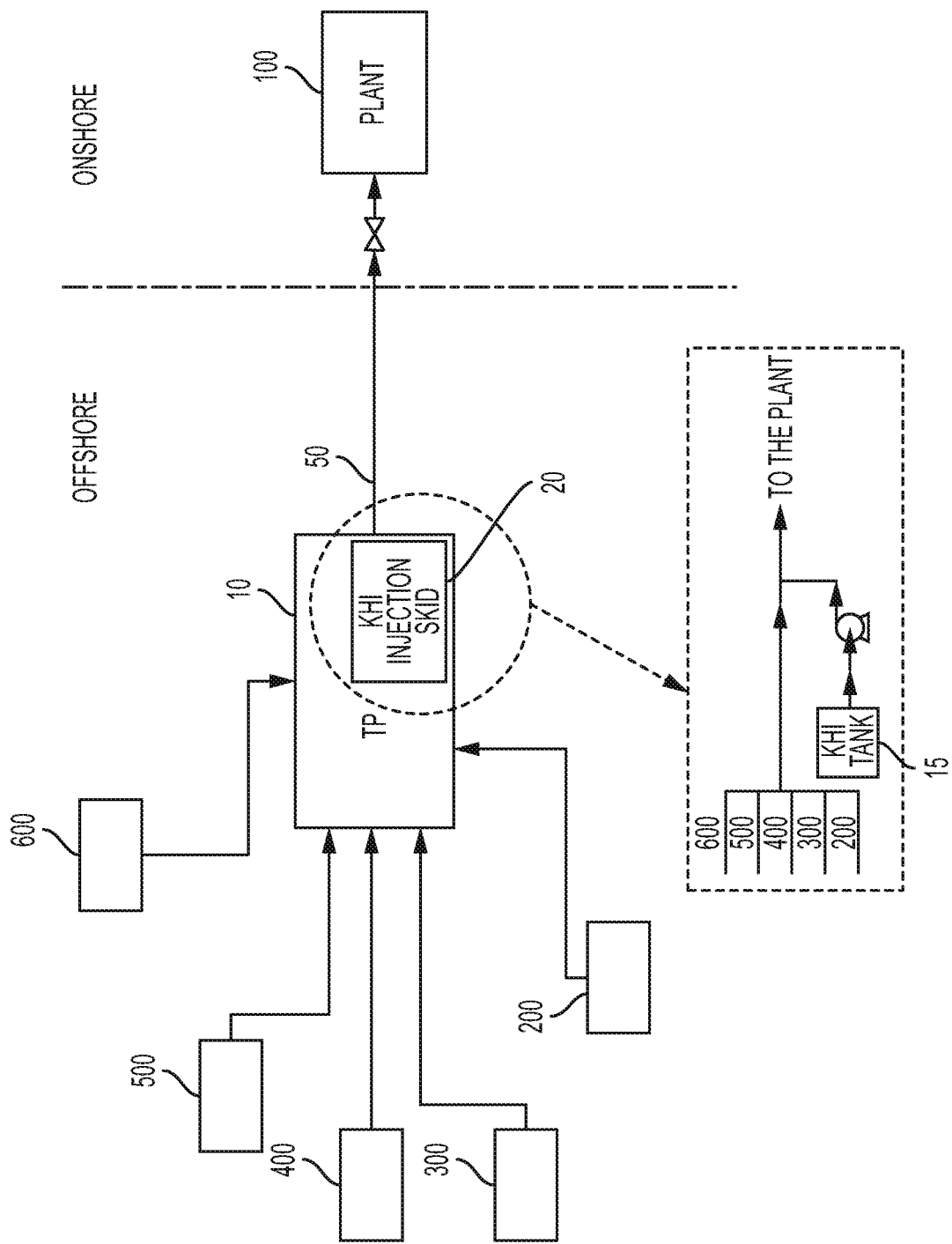

SUCCINIMIDE-BASED COPOLYMERS AND USE AS HYDRATE INHIBITORS

CROSS REFERENCE TO RELATED APPLICATIONS

This application is a Divisional of U.S. application Ser. No. 15/584,389, filed May 2, 2017 which claims priority to U.S. Provisional Application No. 62/332,768, filed May 6, 2016, both of which are incorporated herein by reference.

TECHNICAL FIELD

The present disclosure generally relates to succinimide-based copolymers, to methods for synthesizing copolymers, and to methods for inhibiting formation of clathrate hydrates.

BACKGROUND

Conditions favoring formation of clathrate hydrates are often found in pipelines. With the expansion of offshore gas exploration and production, the formation of clathrate hydrates has become a serious operational concern in both gas transportation and gas processing. Agglomeration and adherence of clathrate hydrates to pipeline walls can reduce gas production, plug sections of the pipeline, and even block the pipeline, thereby leading to a pipeline shutdown. In order to maintain gas production and avoid pipeline shutdown, clathrate hydrate inhibitors have been added to pipeline fluids.

Commercially available clathrate hydrate inhibitors include thermodynamic hydrate inhibitors (that is, THIs), which act to modify the conditions at which clathrate hydrates form in pipeline fluids. For example, THIs may be added to pipeline fluids at high concentrations (for example, up to 0.8 weight/weight, that is w/w of the water cut) to modify the pressure, temperature, or a combination of the pressure and temperature at which clathrate hydrates form. Ethylene glycol (that is, monoethylene glycol or MEG) and methanol are examples of THIs. Another type of commercially available clathrate hydrate inhibitors are low dose hydrate inhibitors (that is, LDHIs), which act to: (1) kinetically delay clathrate hydrate nucleation, and (2) inhibit clathrate hydrate growth. With regard to kinetically delaying clathrate hydrate nucleation, LDHIs may interact with clathrate hydrate nuclei during early formation of clathrate hydrates. With regard to inhibiting clathrate hydrate growth, LDHIs may inhibit clathrate hydrate growth by binding to a surface of the clathrate hydrate. Poly(N-vinylcaprolactam) and poly(N-methyl-N-vinylacetamide) are examples of LDHIs. A third type of commercially available clathrate hydrate inhibitors are anti-agglomerates (that is, AAs), which act to inhibit clathrate hydrate agglomeration. With regard to inhibiting clathrate hydrate agglomeration, AAs may inhibit clathrate hydrate agglomeration by adsorbing to clathrate hydrates to prevent massive accumulation of clathrate hydrates. In one or more embodiments, AAs may inhibit clathrate hydrate agglomeration such that clathrate hydrates are kept in the form of a suspension. Examples of AAs are anti-agglomerates based on quaternary ammonium cations.

Recently, THIs have been replaced by commercially available LDHIs, because THIs are viewed as being difficult to separate from pipeline fluids, are harmful to the environment, and require high concentrations to be effective. However, commercially available LDHIs are also imperfect in that some are inefficient or incompatible with other additives, for example, corrosion inhibitors. Further, commercially available LDHIs which are capable of inhibiting clathrate hydrates having a structure (Type) I (that is, SI) crystalline structure under severe conditions, for example, extreme subcooling temperatures and pressure, are limited. Moreover, commercially available LDHIs, which are capable of inhibiting clathrate hydrates having a SI crystalline structure, are limited to a narrow subcooling temperature range. Also, AAs are imperfect in that they fail to inhibit formation of clathrate hydrates.

SUMMARY

In view of the Background, there is an ongoing need for clathrate hydrate inhibitors and for methods of inhibiting clathrate hydrate formation. Embodiments of the present disclosure are directed to copolymers having General Formula (I):

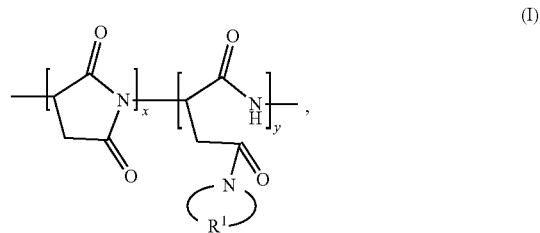

in which: $R^1$ is chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combinations thereof, where: the divalent $C_4$-$C_7$ heteroaliphatic groups include one or two heteroatoms independently chosen from O, N, and S, and the maximum number of heteroatoms in $R^1$ is two; x is a molar fraction range chosen from 0.05 to 0.95; and y is a molar fraction range chosen from 0.05 to 0.95, where the summation of x and y equals 1.

Embodiments of the present disclosure are also directed to methods for inhibiting formation of clathrate hydrates in a fluid capable of forming the clathrate hydrates. The methods include contacting the fluid with at least one copolymer of General Formula (I) under conditions suitable for forming the clathrate hydrates:

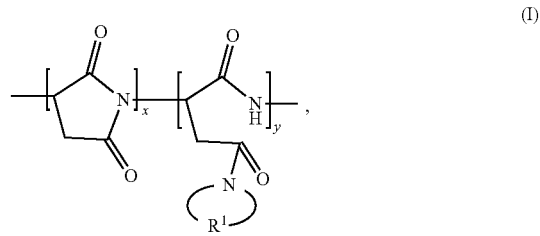

in which: $R^1$ is chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combinations thereof, where: the divalent $C_4$-$C_7$ heteroaliphatic groups include one or two heteroatoms independently chosen from O, N, and S, and the maximum number of heteroatoms in $R^1$ is two; x is a molar fraction range chosen from 0.05 to 0.95; and y is a molar fraction range chosen from 0.05 to 0.95, where the summation of x and y equals 1.

Additional features and advantages of the described embodiments in this disclosure will be set forth in the Detailed Description which follows, and in part will be readily apparent to those skilled in the art from that description or recognized by practicing the embodiments described in this disclosure, including the Detailed Description which follows, the claims, as well as the appended drawings.

It is to be understood that both the foregoing general description and the following Detailed Description describe various embodiments and are intended to provide an overview or framework for understanding the nature and character of the claimed subject matter. The accompanying drawings are included to provide a further understanding of the various embodiments, and are incorporated into and constitute a part of this disclosure. The drawings illustrate the various embodiments described in this disclosure, and together with the Detailed Description serve to explain the principles and operations of the claimed subject matter.

BRIEF DESCRIPTION OF THE DRAWINGS

FIG. 4 is also a graph of Time (Minutes) with respect to Temperature (° C.) of Rocking Cells RC-5 (that is, RC Temperature), where the Temperature (degrees Celsius, that is ° C.) of the Rocking Cells RC-5 is programmed to change in three stages in accordance with the Starting Temperature (° C.), Average Ramp (° C./minute) and Duration (Minutes) as set forth in Table 4;

FIG. 5 is also a graph of Time (Minutes) with respect to Temperature (° C.) of Rocking Cells RC-5 (that is, RC Temperature), where the Temperature (° C.) of the Rocking Cells RC-5 is programmed to change in three stages in accordance with the Starting Temperature (° C.), Average Ramp (° C./minute) and Duration (Minutes) as set forth in Table 5; and FIG. 6 is a schematic depicting an offshore tie-in-platform in fluidic communication with wellheads and with an onshore plant via pipelines, where the tie-in-platform includes a receptacle for holding clathrate hydrate inhibitors.

DETAILED DESCRIPTION

Figure 1:
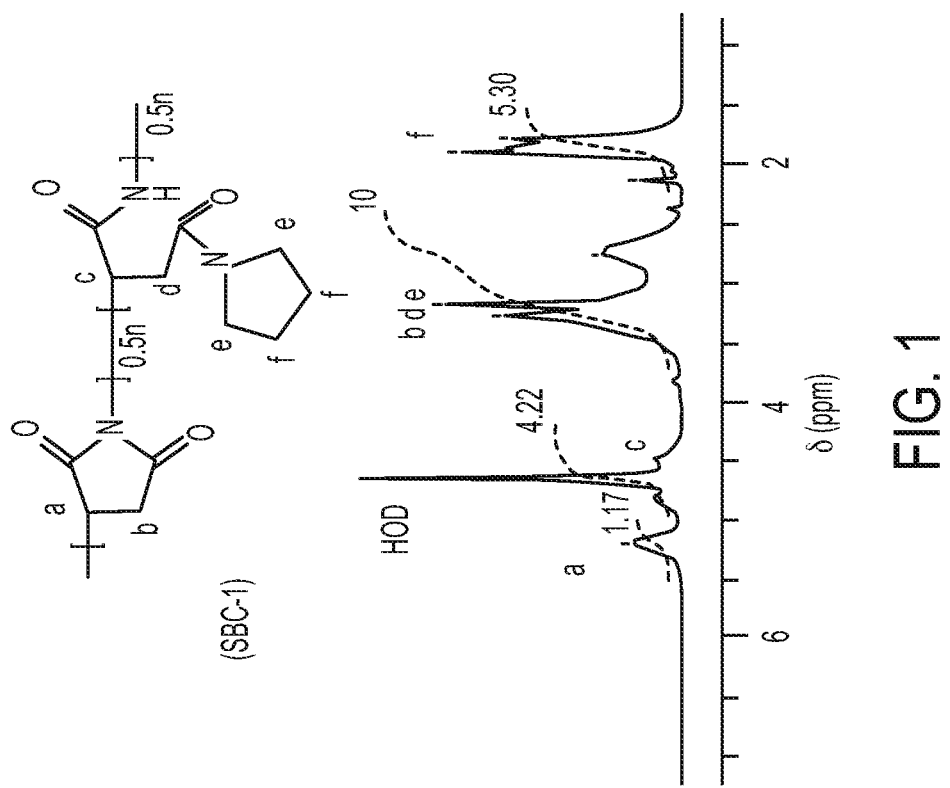
FIG. 1 is a proton nuclear magnetic (that is, $^1$H NMR) spectrum of succinimide-based copolymers having structure (SBC-1) as disclosed in Table 1, where Chemical Shift δ [parts per million, that is ppm]=1.6-2.0 belongs to the 4 hydrogen atoms marked f and has an integrated area (A), where the 2 hydrogen atoms marked d and the 4 hydrogen atoms marked e have an integrated area (B) (where B=[A/4]*6), where the 2 hydrogen atoms marked b have an integrated area (C) which would be calculated as (D−[A/4]*6), where D represents the total area belonging to the hydrogen atoms marked b, d, and e under δ2.4-3.7 ppm, where the mole ratio of the monomeric repeating units is calculated as (C/2):(A/4), based on the ratio of a single hydrogen atom of the first and second monomeric repeating units, and where dashed lines are depicted for estimating via integration the number of protons associated with spectrum peaks.

While the following terms are believed to be well understood by one of ordinary skill in the art, definitions are set forth to facilitate explanation of the presently-disclosed subject matter.

The term "copolymer" refers to a polymer having two or more different monomeric repeating units. For example, the copolymer may include two different monomeric repeating units (that is, a bipolymer). In one or more embodiments, the copolymers are random. As will be appreciated by one of ordinary skill in the art, the copolymers are random when the distribution of monomeric repeating units follows statistical laws. For example, copolymers are random when the probability of finding a given monomeric repeating unit at a particular point in the polymer chain is equal to the mole fraction of that monomeric repeating unit in the chain. Random copolymers may also be referred to as statistical copolymers.

The term "monovalent" refers to a radical having an unsatisfied valence of one, where a valence "—" is unsatisfied at one end of the radical. For example, in embodiments where a hydrocarbon group is present at one end of an aliphatic radical or a heteroaliphatic radical, the aliphatic radical or the heteroaliphatic radical is monovalent when one hydrogen atom has been removed from the hydrocarbon group present at one end of the aliphatic radical or the heteroaliphatic radical. As another example, in embodiments where a heteroatom is present at one end of the heteroaliphatic radical, the heteroaliphatic radical is monovalent when the heteroatom present at one end of the heteroaliphatic radical has an unsatisfied valence "—".

The term "divalent" refers to a radical having an unsatisfied valence of two, where a valence "—" is unsatisfied at two ends of the radical. For example, in embodiments where a hydrocarbon group is present at two ends of an aliphatic radical or a heteroaliphatic radical, the aliphatic radical or the heteroaliphatic radical is divalent when one hydrogen atom has been removed from each of the hydrocarbon groups present at two ends of the aliphatic radical or the heteroaliphatic radical. As another example, in embodiments where a heteroatom is present at two ends of the heteroaliphatic radical, the heteroaliphatic radical is divalent when each of the heteroatoms present at two ends of the heteroaliphatic radical has an unsatisfied valence "—". Similarly, as another example, in embodiments where a hydrocarbon group is present at one end of a heteroaliphatic radical and a heteroatom is present at one end of the heteroaliphatic radical, the heteroaliphatic radical is divalent when one hydrogen atom has been removed from the hydrocarbon group present at one end of the heteroaliphatic radical and when the heteroatom present at one end of the heteroaliphatic radical has an unsatisfied valence "—".

The term "aliphatic" refers to saturated straight chain (that is, linear or unbranched) and branched hydrocarbon radicals. In embodiments, the aliphatic hydrocarbon radicals are monovalent or divalent. As will be appreciated by one of ordinary skill in the art, aliphatic is intended to include, but is not limited to, alkyl moieties. Thus, the term "alkyl" includes straight and branched alkyl groups. In certain embodiments, the term "lower alkyl" may be used to indicate alkyl groups (branched or unbranched) having from 1 to 6 carbon atoms.

In embodiments, the alkyl groups described contain from 1 to 7 aliphatic carbon atoms. In other embodiments, the alkyl groups described contain from 1 to 6 aliphatic carbon atoms. In still other embodiments, the alkyl groups described contain from 1 to 4 aliphatic carbon atoms. Illustrative aliphatic groups thus include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like.

The term "heteroaliphatic" refers to aliphatic radicals in which one or more carbon atoms in the main chain have been substituted with a heteroatom. By way of example, an aliphatic radical having four main chain atoms where one carbon atom has been substituted with one heteroatom is referred to as a $C_4$ heteroaliphatic. As another example, an aliphatic radical having seven main chain atoms where two carbon atoms have been substituted with two heteroatoms is referred to as a $C_7$ heteroaliphatic. In embodiments, the heteroaliphatic radicals are monovalent or divalent. Thus, heteroaliphatic is intended to include aliphatic chains which contain one or more oxygen, sulfur, or nitrogen atoms, for example, in place of carbon atoms. Heteroaliphatic moieties may be linear or branched.

The term "heterocycloalkyl," "heterocycle," or "heterocyclic" refers to radicals that combine the properties of heteroaliphatic and cyclic moieties and include, but are not limited to, saturated mono- or polycyclic ring systems having from 5 to 8 atoms, where at least one ring atom is a N heteroatom; and where zero, one or two ring atoms are additional heteroatoms independently chosen from S, O, and N (where the nitrogen and sulfur heteroatoms may optionally be oxidized). In certain embodiments, the terms heterocycloalkyl, heterocycle or heterocyclic refer to non-aromatic 5-membered, 6-membered, or 7-membered rings or polycyclic moieties where at least one ring atom is a N heteroatom, and where zero, one or two ring atoms are additional heteroatoms independently chosen from S, O, and N (where the nitrogen and sulfur heteroatoms may optionally be oxidized and the nitrogen atom may be quarternized) including, but not limited to, bicyclic or tricyclic groups. Representative heterocycles include, but are not limited to, heterocycles such as pyrrolidinyl, pyrazolidinyl, imidazolidinyl, piperidinyl, piperazinyl, oxazolidinyl, isoxazolidinyl, morpholinyl, thiazolidinyl, isothiazolidinyl, dithiazolyl, dithiazolidinyl, and azepanyl. In embodiments, the heterocycloalkyls, heterocycles or heterocyclics are saturated mono- or polycyclic moieties having from 5 to 8 ring atoms of which one ring atom is N; and of which zero, one or two ring atoms are additional heteroatoms independently chosen from S, O, and N; and the remaining ring atoms are carbon, the radicals being joined to the rest of the molecule via a N ring atom, such as, for example, pyrollidinyl, pyrazolidinyl, imidazolidinyl, piperidinyl, piperazinyl, morpholinyl, thiazolidinyl, and azepanyl.

The term "clathrate hydrates" refers to crystalline water-based solids in which host water molecules enclathrate gas guest molecules. In one or more embodiments, crystalline water-based solids in which host water molecules are hydrogen bonded around the gas guest molecules such that the gas guest molecules are trapped inside cages of hydrogen bonded host water molecules. The clathrate hydrates may include a structure (Type) I (that is, SI), a structure (Type) II (that is, SII), or a structure (Type) H (that is, SH) crystalline structure.

The terms "inhibit", "inhibition", and "inhibiting" refer to any improvement in controlling, delaying, reducing, mitigating, preventing, or combinations thereof the formation, growth, adherence, agglomeration, or combinations thereof of clathrate hydrates in any manner. For example, clathrate hydrate inhibition includes, but should not be limited to, thermodynamically modifying the conditions at which clathrate hydrates form, kinetically delaying clathrate hydrate nucleation, dissolving clathrate hydrates, breaking up clathrate hydrates, or combinations thereof. Further, clathrate hydrate inhibition may include the complete cessation of clathrate hydrate formation, where clathrate hydrate formation is entirely prevented.

The terms "formation", "forming", and "form" refer to any process in which host water molecules enclathrate gas guest molecules in a crystalline structure, in which clathrate hydrates grow, in which clathrate hydrates adhere, in which clathrate hydrates agglomerate, or combinations thereof. The term "enclathrate" refers to hydrogen bonding of host water molecules around gas guest molecules.

The terms "subcooling temperature" and "$T_{sc}$" refer to the difference between an operating temperature of a field gas and the three-phase equilibrium temperature of the clathrate hydrate of the field gas at 70 bars. Thus, the term "first subcooling temperature" refers to the difference between an operating temperature of a field gas in a first operation stage and the three-phase equilibrium temperature. In embodiments, the first subcooling temperature is from about 0° C. to about 4.0° C., or from about 0° C. to about 1.0° C., or from about 1.0° C. to about 2.0° C., or from about 2.0° C. to about 3.5° C., or about 4.0° C. Similarly, the term "second subcooling temperature" refers to the difference between an operating temperature of a field gas in a second operation stage and the three-phase equilibrium temperature. In embodiments, the second subcooling temperature is from about 4.0° C. to about 10.0° C., or from about 4.0° C. to about 4.6° C., or from about 4.6° C. to about 5.6° C., or from about 5.6° C. to about 7.0° C., or from about 7.0° C. to about 8.0° C., or about 5.6° C. Additionally, the term "third subcooling temperature" refers to the difference between an operating temperature of a field gas in a third operation stage and the three-phase equilibrium temperature. In embodiments, the third subcooling temperature is from about 5.6° C. to about 15.0° C., or from about 5.6° C. to about 7.0° C., or from about 7.0° C. to about 8.6° C., or from about 8.6° C. to about 10.5° C., or from about 10.5° C. to about 12.0° C., or from about 12.0° C. to about 15.0° C., or about 10.5° C.

Embodiments of the present disclosure are directed toward succinimide-based copolymers (that is, SBC) having General Formula (I), to methods for synthesizing succinimide-based copolymers having General Formula (I), and to methods for inhibiting formation of clathrate hydrates using succinimide-based copolymers having General Formula (I). Embodiments of the succinimide-based copolymers having General Formula (I) will now be described in detail. Thereafter, embodiments of methods for synthesizing copolymers of General Formula (I) will be described. Then, methods for inhibiting formation of clathrate hydrates using succinimide-based copolymers having General Formula (I) will be described with reference to FIG. 6.

I. Succinimide-Based Copolymers of General Formula (I)

In one or more embodiments, the disclosure describes succinimide-based copolymers having General Formula (I):

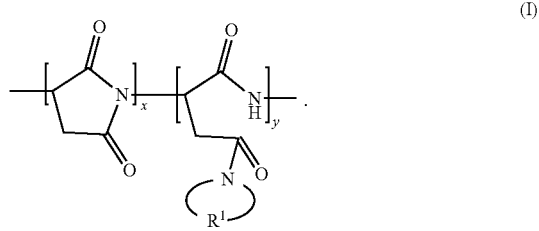

(I)

In the copolymers of General Formula (I), $R^1$ is chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combinations thereof; where the divalent $C_4$-$C_7$ heteroaliphatic groups include one or two heteroatoms independently chosen from O, N, and S, and where the maximum number of heteroatoms in $R^1$ is two; $x$ is a molar fraction range chosen from about 0.05 to about 0.95; and $y$ is a molar fraction range chosen from about 0.05 to about 0.95, where the summation of $x$ and $y$ equals 1.

In the copolymers of General Formula (I), $R^1$ is chosen from divalent $C_4$-$C_7$ aliphatic groups and divalent $C_4$-$C_7$ heteroaliphatic groups. In embodiments, $R^1$ is chosen from divalent $C_4$-$C_7$ linear aliphatic groups, divalent $C_4$-$C_7$ branched aliphatic groups, divalent $C_4$-$C_7$ linear heteroaliphatic groups, and divalent $C_4$-$C_7$ branched heteroaliphatic groups. In embodiments, $R^1$ is chosen from divalent $C_4$-$C_6$ linear aliphatic groups and divalent $C_4$-$C_6$ linear heteroaliphatic groups. In other embodiments, $R^1$ is chosen from $C_4$-$C_6$ linear aliphatic groups. In illustrative, non-limiting embodiments, $R^1$ is chosen from —$(CH_2)_4$—, —$(CH_2)_5$—, and —$(CH_2)_6$—.

In one or more embodiments, $R^1$ is optionally substituted with one or more substituting groups. In embodiments where $R^1$ is substituted with one or more substituting groups, $R^1$ may include from 1 to 8, or from 2 to 6, or from 3 to 5 substituting groups. In embodiments where $R^1$ is chosen from divalent $C_4$-$C_7$ aliphatic groups and divalent $C_4$-$C_7$ heteroaliphatic groups and is substituted with one or more substituting groups, the divalent $C_4$-$C_7$ aliphatic groups and the divalent $C_4$-$C_7$ heteroaliphatic groups include additional unsatisfied valences "—" within the divalent $C_4$-$C_7$ aliphatic groups and the divalent $C_4$-$C_7$ heteroaliphatic groups to accommodate bonding with the substituting groups. For example, in embodiments where $R^1$ is chosen from divalent $C_4$-$C_7$ aliphatic groups and divalent $C_4$-$C_7$ heteroaliphatic groups and is substituted, additional hydrogen atoms may have been removed from the hydrocarbon groups present within the divalent $C_4$-$C_7$ aliphatic groups and the divalent $C_4$-$C_7$ heteroaliphatic groups to accommodate bonding with the substituting groups.

In embodiments, $R^1$ is optionally substituted with one or more $C_1$-$C_6$ aliphatic groups, heteroatoms independently chosen from O, N, and S, or combinations thereof. In embodiments, $R^1$ is optionally substituted with one or more $C_1$-$C_6$ linear aliphatic groups, $C_1$-$C_6$ branched aliphatic groups, heteroatoms independently chosen from O, N, and S, or combinations thereof. In embodiments, $R^1$ is substituted with one or more $C_1$-$C_6$ linear aliphatic groups, $C_1$-$C_6$ branched aliphatic groups, or combinations thereof. In illustrative, non-limiting embodiments, $R^1$ is substituted with one or more lower alkyls. In other illustrative, non-limiting embodiments, $R^1$ is substituted with one or more $C_1$-$C_4$ linear aliphatic groups, $C_1$-$C_4$ branched aliphatic groups, or combinations thereof. In still other illustrative, non-limiting embodiments, $R^1$ is substituted with one or more $C_2$-$C_3$ linear aliphatic groups, $C_2$-$C_3$ branched aliphatic groups, or combinations thereof. In yet still other illustrative, non-limiting embodiments, $R^1$ is substituted with one or more $C_1$-$C_3$ linear aliphatic groups, $C_1$-$C_3$ branched aliphatic groups, or combinations thereof. In still other illustrative, non-limiting embodiments, $R^1$ is substituted with one or more substituting groups independently chosen from methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties, or combinations thereof.

In other embodiments, $R^1$ is substituted with one or more heteroatoms independently chosen from O, N, and S. In embodiments where $R^1$ is substituted with one or more heteroatoms independently chosen from O, N, and S, the heteroatoms may form a single bond or a double bond with $R^1$. In illustrative, non-limiting embodiments, $R^1$ is substituted with one heteroatom chosen from O, N, and S. In other illustrative, non-limiting embodiments, $R^1$ is substituted with one heteroatom, where the one heteroatom is O.

In embodiments where $R^1$ is chosen from divalent $C_4$-$C_7$ aliphatic groups and divalent $C_4$-$C_7$ heteroaliphatic groups, the $C_4$-$C_7$ aliphatic groups and the $C_4$-$C_7$ heteroaliphatic groups include an unsatisfied valence "—" at two ends. In this way, $R^1$ forms a heterocycloalkyl or a heterocycle when bonded with the —N— in the rest of the copolymer molecule via its two unsatisfied end valences. In embodiments, the heterocycloalkyl or heterocycle formed when $R^1$ is bonded with the —N— in the rest of the copolymer is non-aromatic. In illustrative, non-limiting embodiments, the heterocycloalkyl or heterocycle formed is chosen from pyrollidinyl, pyrazolidinyl, imidazolidinyl, piperidinyl, piperazinyl, morpholinyl, thiazolidinyl, and azepanyl. In further illustrative, non-limiting embodiments, the heterocycloalkyl, or heterocycle formed is chosen from pyrrolidinyl, piperidinyl, and azepanyl.

In embodiments, the heterocycloalkyl or heterocycle formed has the following structure:

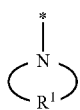

where the heterocycloalkyl or heterocycle is attached to the rest of the copolymer molecule via *. In embodiments, the

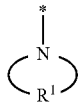

is substituted. In illustrative, non-limiting embodiments, the

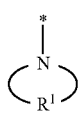

is chosen from

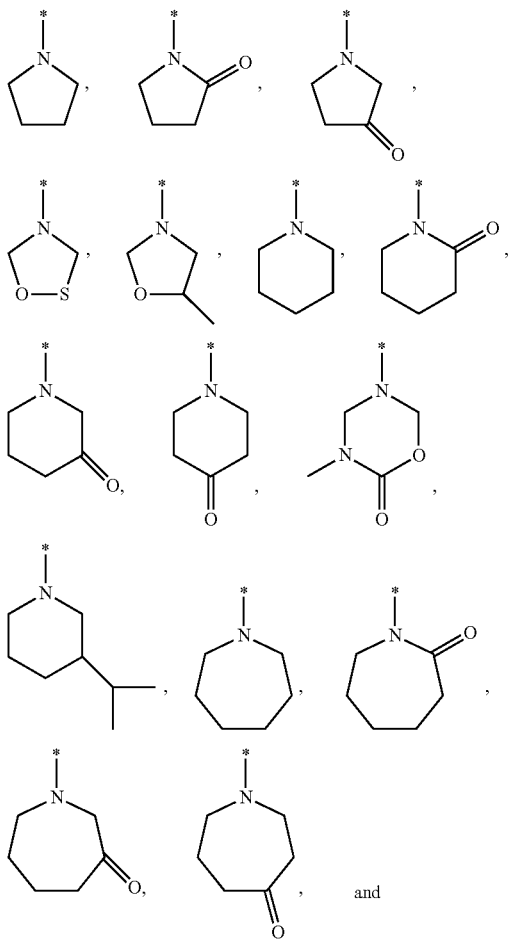

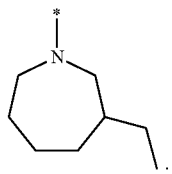

In other illustrative, non-limiting embodiments, the

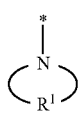

is chosen from

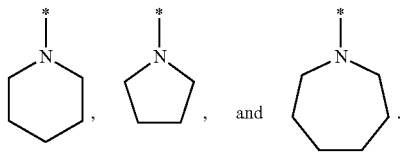

In the copolymers of General Formula (I), x is a molar fraction range chosen from about 0.05 to about 0.95. In embodiments, x is a molar fraction range chosen from about 0.1 to about 0.9, or from about 0.3 to about 0.7, or a molar fraction of about 0.5. In illustrative, non-limiting embodiments, x is a molar fraction range of from about 0.15 to about 0.85. In yet other illustrative, non-limiting embodiments, x is a molar fraction of greater than 0.

In the copolymers of General Formula (I), y is a molar fraction range chosen from about 0.05 to about 0.95. In embodiments, y is a molar fraction range chosen from about 0.1 to about 0.9, or from about 0.3 to about 0.7, or a molar fraction of about 0.5. In illustrative, non-limiting embodiments, y is a molar fraction range of from about 0.15 to about 0.85. In yet other illustrative, non-limiting embodiments, y is a molar fraction of greater than 0.

In the copolymers of General Formula (I), the summation of x and y equals 1. In one or more embodiments, x is a molar fraction of greater than 0 and y is a molar fraction of greater than 0. In embodiments, x and y are equimolar fractions.

In embodiments, the viscosity average molecular weight of the copolymers of General Formula (I) is from about 1,000 grams/mole (that is g/mol), to about 20,000 g/mol, or from about 1,500 g/mol to about 15,000 g/mol, or from about 5,000 g/mol to about 10,000 g/mol, or about 8,000 g/mol. In illustrative, non-limiting embodiments, the viscosity average molecular weight of the copolymers of General Formula (I) is from about 5,000 g/mol to about 15,000 g/mol. In embodiments, the viscosity average molecular weight of the copolymers was determined via gel permeation chromatography (that is, GPC), employing 0.7% trimethylamine in tetrahydrofuran (that is, THF) as a mobile phase, Phenogel™ (Phenomenex, Sutter Creek, Calif.) as stationary phases (of differing pore sizes, 500 Å, 100 Å, and 50 Å) in three columns in series, with a refractive index detector (that is, RID). Calibration was performed using polystyrene standards. Moreover, the viscosity average molecular weight of the copolymers of General Formula (I) as determined by GPC was confirmed via sulfur elemental analysis.

In illustrative, non-limiting embodiments, $R^1$ is chosen from divalent $C_4$-$C_6$ linear aliphatic groups and divalent $C_4$-$C_6$ linear heteroaliphatic groups; x is a molar fraction range chosen from about 0.15 to about 0.85; and y is a molar fraction range chosen from about 0.15 to about 0.85. In other illustrative, non-limiting embodiments, $R^1$ is chosen from divalent $C_4$-$C_6$ linear aliphatic groups; x is a molar fraction range chosen from about 0.15 to about 0.85; and y is a molar fraction range chosen from about 0.15 to about 0.85. In still other illustrative, non-limiting embodiments, $R^1$ is chosen from divalent $C_4$-$C_6$ linear aliphatic groups; x is a molar fraction range chosen from about 0.3 to about 0.7; and y is a molar fraction range chosen from about 0.3 to about 0.7.

In illustrative, non-limiting embodiments,

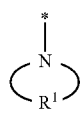

is chosen from

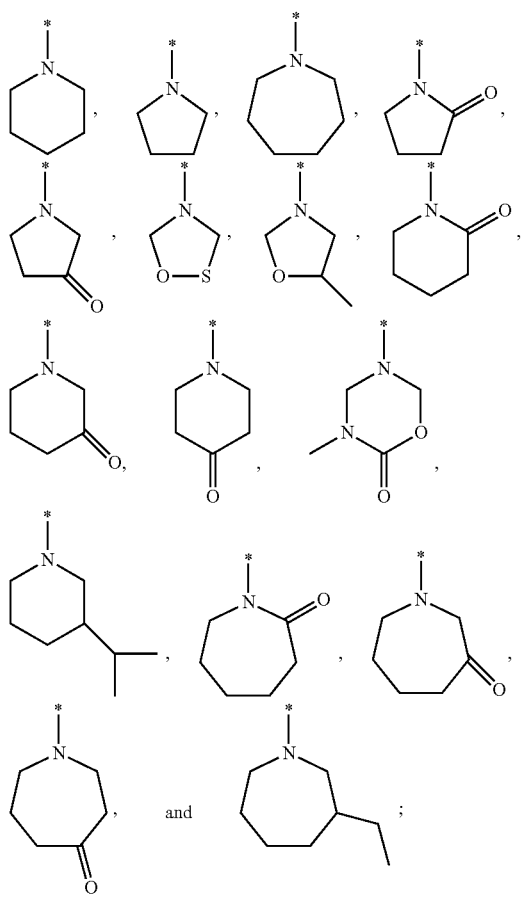

x is a molar fraction range of from about 0.3 to about 0.7; and y is a molar fraction range of from about 0.3 to about 0.7. In other illustrative, non-limiting embodiments,

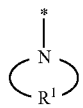

is chosen from

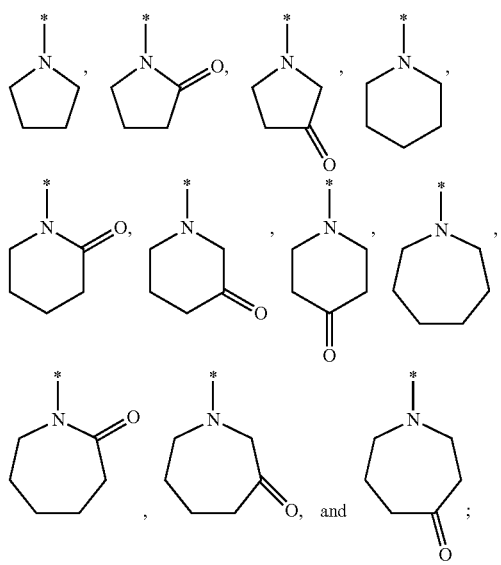

x is a molar fraction of about 0.5; and y is a molar fraction of about 0.5. In still other illustrative, non-limiting embodiments,

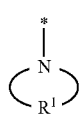

is chosen from

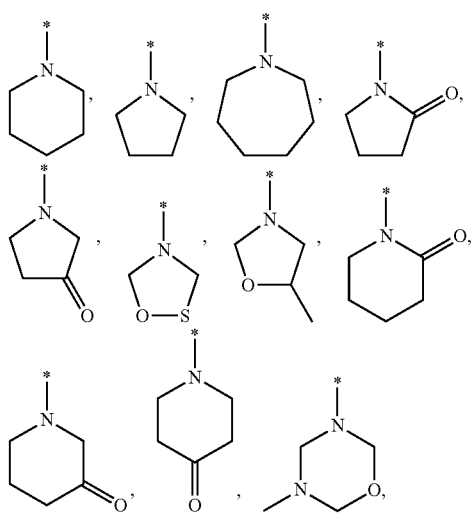

-continued

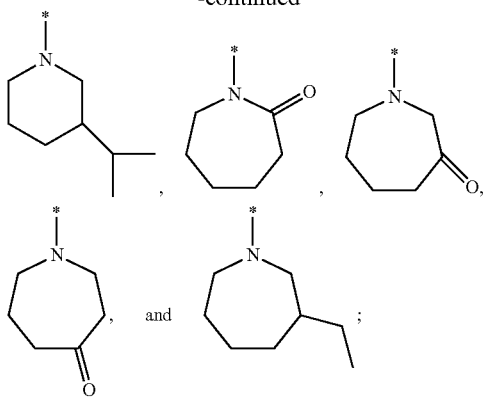
, and ;

and x and y are equimolar fractions. In yet still other illustrative, non-limiting embodiments,

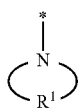

is chosen from

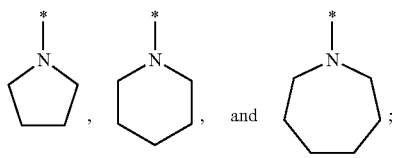
, and ;

x is a molar fraction of about 0.5; and y is a molar fraction of about 0.5.

In other illustrative, non-limiting embodiments, x is a molar fraction range of from about 0.15 to about 0.85; and y is a molar fraction range of from about 0.15 to about 0.85. In still other illustrative, non-limiting embodiments, x is a molar fraction range of from about 0.3 to about 0.7; and y is a molar fraction range of from about 0.3 to about 0.7. In yet still other illustrative, non-limiting embodiments, x is a molar fraction of about 0.5; and y is a molar fraction of about 0.5.

In Table 1, copolymers having General Formula (I) according to various embodiments are provided:

TABLE 1

| Copolymers of General Formula (I) | | |
| --- | --- | --- |
| Reference | Copolymer of General Formula (I) | Name |
| SBC-1 | | Polypyrrolidino-aspartamide-Ran-Polysuccinimide |
| SBC-2 | | Polypiperidino-aspartamide-Ran-Polysuccinimide |
| SBC-3 | | Polyazapano-aspartamide-Ran-Polysuccinimide |

In embodiments, the at least one copolymer of General Formula (I) is water soluble. In further embodiments, the at least one copolymer of General Formula (I) is thermally stable. In illustrative, non-limiting embodiments, the at least one copolymer of General Formula (I) is thermally stable up to a temperature of about 50° C. In embodiments, the at least one copolymer of General Formula (I) is in the form of a sodium salt.

Embodiments of succinimide-based copolymers having General Formula (I) have been described in detail. Embodiments of methods for synthesizing the copolymers of General Formula (I) will be described.

II. Methods for Synthesizing the Copolymers of General Formula (I)

In one or more embodiments, the disclosure describes methods for synthesizing the copolymers of General Formula (I). However, the copolymers of General Formula (I) may be synthesized via any suitable synthetic scheme known to a person of ordinary skill in the art. In illustrative, non-limiting embodiments, the copolymers of General Formula (I) were synthesized in accordance with the following reaction scheme:

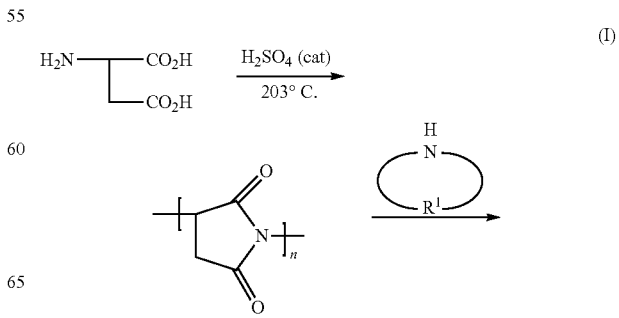

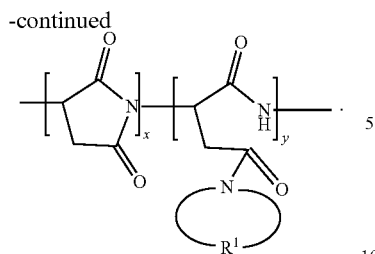

More specifically, succinimide-based copolymers having General Formula (I) were synthesized by grinding L-aspartic acid (about 66.5 grams or g, 0.5 moles or m) with a mortar and pestle while adding concentrated $H_2SO_4$ (about 3.3 g) to the L-aspartic acid dropwise to form a grinded mixture. The grinded mixture was stirred in a round bottom flask using a magnetic stir-bar and heated via an oil bath at about 203° C. After 30 minutes, the grinded mixture was cooled to room temperature, grinded thoroughly, and heated under stirring again at about 203° C. for 7 hours. The grinded mixture was then cooled to room temperature and filtered while washing with hot water (about 300 milliliters, that is mL, 55° C.) and methanol (about 150 mL). The resultant polysuccinimide (that is, PSI), was dried under vacuum at about 70° C. to a constant weight (about 42 g, 87%).

After drying the PSI under vacuum at about 70° C.,

(about 50 millimoles, that is mmol) (that is, a cyclic amine) was added dropwise to the dried PSI (about 9.7 g, 100 mL) in DMF (about 40 mL) at about 0° C. over a period of 5 minutes to form a reaction mixture. The reaction mixture was stirred at room temperature for 18 hours. The product of the reaction mixture was precipitated in acetone, filtered, and dried under vacuum at about 60° C. to a constant weight to obtain succinimide-based copolymers of General Formula (I):

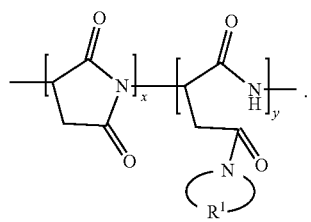

(I)

The succinimide-based copolymers of General Formula (I) were found to be soluble in water was well as methanol. In embodiments, $R^1$ of

and x, and y of General Formula (I) are as described previously with regard to General Formula (I). As will be appreciated by one of ordinary skill in the art, quantities of reactants, for example,

in the grinded mixture or the reaction mixture may be adjusted. For example, quantities of reactants may be adjusted to achieve varying molar fractions x and y of each monomeric repeating unit.

Embodiments of methods for synthesizing the copolymers of General Formula (I) have now been described in detail. Embodiments of methods for inhibiting formation of clathrate hydrates will now be described in detail with reference to FIG. 6.

III. Methods for Inhibiting Formation of Clathrate Hydrates

In one or more embodiments, the disclosure describes methods for inhibiting clathrate hydrates in a fluid capable of forming the clathrate hydrates, the methods including contacting the fluid with at least one copolymer of General Formula (I) under conditions suitable for forming the clathrate hydrates. In further embodiments, the at least one copolymer of General Formula (I) is as described previously.

In embodiments, in the at least one copolymer of General Formula (I), $R^1$ is chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combinations thereof; where: the divalent $C_4$-$C_7$ heteroaliphatic groups include one or two heteroatoms independently chosen from O, N, and S, and the maximum number of heteroatoms in $R^1$ is two; x is a molar fraction range chosen from 0.05 to 0.95; and y is a molar fraction range chosen from 0.05 to 0.95, where the summation of x and y equals 1.

In illustrative, non-limiting embodiments, in the at least one copolymer of General Formula (I), $R^1$ is chosen from divalent $C_4$-$C_6$ linear aliphatic groups and divalent $C_4$-$C_6$ linear heteroaliphatic groups; x is a molar fraction range of from about 0.15 to about 0.85; and y is a molar fraction range of from about 0.15 to about 0.85. In other illustrative, non-limiting embodiments, $R^1$ is chosen from divalent $C_4$-$C_6$ linear aliphatic groups; x is a molar fraction range chosen from about 0.3 to about 0.7; and y is a molar fraction range chosen from about 0.3 to about 0.7. In still other illustrative, non-limiting embodiments,

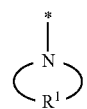

is chosen from

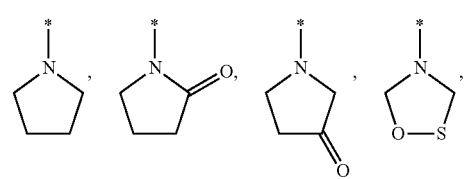

-continued

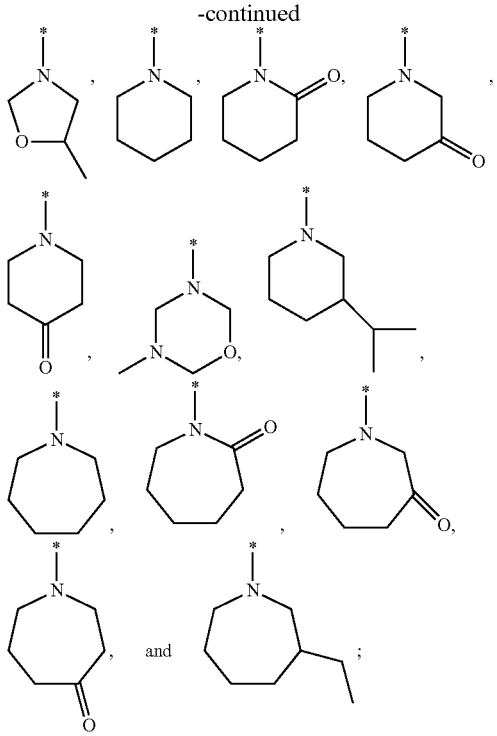

x is a molar fraction of about 0.5; and y is a molar fraction of about 0.5. In yet still other illustrative, non-limiting embodiments,

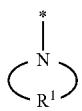

is chosen from

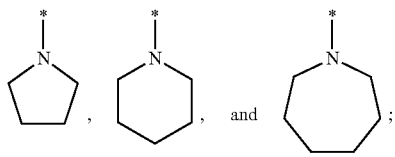

x is a molar fraction of about 0.5; and y is a molar fraction of about 0.5. In other illustrative, non-limiting embodiments, in the at least one copolymer of General Formula (I), the viscosity average molecular weight of the copolymer is from about 1,000 g/mol to about 20,000 g/mol.

In embodiments, the fluid is contacted with a formulation including the at least one copolymer of General Formula (I). More specifically, in embodiments, the formulation includes one or more of the at least one copolymer of General Formula (I) (for example, two or more copolymers of General Formula (I) could be used), solvents, or additives. In embodiments, the at least one copolymer of General Formula (I) is compatible with additives. In embodiments, the additives are chosen from corrosion inhibitors and synergists. In illustrative, non-limiting embodiments, the formulation includes from about 0.01% to about 15% of the at least one copolymer of General Formula (I), from about 0% to about 20% of the solvent, and from about 0% to about 1% of the additive. In other illustrative, non-limiting embodiments, the formulation includes from about 0.1% to about 5% of the at least one copolymer of General Formula (I), from about 0% to about 10% of the solvent, from 0% to about 10% of the additives, from 0 parts per million (that is, ppm; a mass fraction) to about 3000 ppm of the corrosion inhibitors, from 0 ppm to about 3000 ppm of the scale inhibitors, from 0% to about 40% of the thermodynamic hydrate inhibitors, and from about 0.1% to about 10% of the anti-agglomerates. In embodiments, the amounts disclosed of the formulation relate to the percentage or ppm of the water cut.

In illustrative, non-limiting embodiments, the solvents are chosen from water, alcohols, for example, monoethylene glycol, methanol, ethanol, and isobutanol, ketones, ethers, and non-polar aromatics, for example, toluene and benzene. In further illustrative, non-limiting embodiments, the solvents are alcohols chosen from glycols, for example, monoethylene glycol. In other illustrative, non-limiting embodiments, the additives are chosen from corrosion inhibitors and synergists. In illustrative, non-limiting embodiments, the corrosion inhibitors include gas corrosion inhibitors. In embodiments, the synergists are chosen from scale inhibitors, thermodynamic hydrate inhibitors, low dose hydrate inhibitors, and anti-agglomerates. In illustrative, non-limiting embodiments, the thermodynamic hydrate inhibitors are chosen from glycol ethers and methanol. In illustrative, non-limiting embodiments, low dose hydrate inhibitors are chosen from Poly(N-vinylcaprolactam) and poly(N-methyl-N-vinylacetamide).

In embodiments, the fluid is contacted with at least one copolymer of General Formula (I) under conditions suitable for forming clathrate hydrates. In embodiments, the fluid is contacted with about 3 weight % of the formulation, where the amount of formulation relates to the percentage of the water cut. In embodiments, the at least one copolymer of General Formula (I) is contacted with the fluid via methods known to one of ordinary skill in the art. For example, the at least one copolymer of General Formula (I) may be contacted with the fluid via adding, combining, mixing, injecting, or combinations thereof. In illustrative, non-limiting embodiments, conditions suitable for forming clathrate hydrates include conditions where the pressure on the fluid is from about 11 bara to about 200 bara, or from about 11 bara to about 50 bara, or from about 50 bara to about 70 bara, or from about 70 bara to about 100 bara, or from about 100 bara to about 140 bara, or from about 140 bara to about 150 bara, or from about 150 bara to about 200 bara, and also includes conditions where the temperature of the fluid is from about 0° C. to about 25° C., or from about 0° C. to about 10° C., or from about 10° C. to about 12° C., or from about 12° C. to about 16° C., or from about 16° C. to about 19° C., or from about 19° C. to about 20° C., or from about 20° C. to about 25° C. In illustrative, non-limiting embodiments, conditions suitable for forming clathrate hydrates include conditions where the temperature of the fluid is equal to or less than the three-phase equilibrium temperature.

In other embodiments, contacting the fluid with at least one copolymer of General Formula (I) under conditions suitable for forming the clathrate hydrates is effective to inhibit or inhibits the formation of the clathrate hydrates at a first subcooling temperature. In other embodiments, contacting the fluid with at least one copolymer of General Formula (I) under conditions suitable for forming the clathrate hydrates is effective to inhibit or inhibits the formation of the clathrate hydrates at a second subcooling temperature. In still other embodiments, contacting the fluid with at least one copolymer of General Formula (I) under conditions suitable for forming the clathrate hydrates is effective to inhibit or inhibits the formation of the clathrate hydrates at a third subcooling temperature.

In illustrative, non-limiting embodiments, contacting the fluid with at least one copolymer of General Formula (I) under conditions suitable for forming the clathrate hydrates is effective to inhibit or inhibits the formation of the clathrate hydrates in a pressure range of from about 40 bars to about 200 bars. In other illustrative, non-limiting embodiments, contacting the fluid with at least one copolymer of General Formula (I) under conditions suitable for forming the clathrate hydrates is effective to inhibit or inhibits the formation of the clathrate hydrates in a pressure range of from about 70 bars to about 100 bars.

In embodiments, the fluid capable of forming clathrate hydrates includes water host molecules and natural gas guest molecules. In further embodiments, the natural gas guest molecules are chosen from methane, ethane, propane, butane, pentane, carbon dioxide, hydrogen sulfide, nitrogen, or combinations thereof. In illustrative, non-limiting embodiments, the fluid capable of forming clathrate hydrates includes natural gas guest molecules in the following compositional amounts: methane (from about 60-90 mole %); ethane (from about 0-4 mole %); propane (from about 0-1 mole %); butane (from about 0-1 mole %); carbon dioxide (from about 5-15 mole %); hydrogen sulfide (from about 0-5 mole %); and nitrogen (from about 5-15 mole %). In other embodiments, the fluid capable of forming clathrate hydrates includes brine, such as is described subsequently in Table 2. In illustrative, non-limiting embodiments, the brine includes chloride anions, sodium cations, acetic acid, formic acid, a conjugate base of acetic acid, a conjugate base of formic acid, or combinations thereof.

In illustrative, non-limiting embodiments, the fluid capable of forming clathrate hydrates includes acid gas guest molecules. For example, in embodiments, the fluid capable of forming clathrate hydrates includes carbon dioxide and hydrogen sulfide. In illustrative, non-limiting embodiments, the fluid capable of forming clathrate hydrates is rich in carbon dioxide, hydrogen sulfide, or a combination of carbon dioxide and hydrogen sulfide. For example, the fluid capable of forming clathrate hydrates may be rich in hydrogen sulfide where it includes at least about 2 mole % of hydrogen sulfide. As another example, the fluid capable of forming clathrate hydrates may be rich in carbon dioxide where it includes at least about 8 mole % of carbon dioxide. As yet another example, the fluid capable of forming clathrate hydrates may be rich in both carbon dioxide and hydrogen sulfide where it includes at least about 8 mole % of carbon dioxide and at least about 2 mole % of hydrogen sulfide. In still other illustrative, non-limiting embodiments, the fluid capable of forming clathrate hydrates includes carbon dioxide, hydrogen sulfide, nitrogen, or combinations thereof. In yet other illustrative, non-limiting embodiments, the fluid capable of forming clathrate hydrates includes methane, ethane, propane, butane, carbon dioxide, hydrogen sulfide, and nitrogen gas guest molecules. In yet still other illustrative, non-limiting embodiments, the fluid capable of forming clathrate hydrates does not include hydrogen sulfide, carbon dioxide, or a combination of hydrogen sulfide and carbon dioxide.

In embodiments, the fluid capable of forming clathrate hydrates is capable of forming SI clathrate hydrates, SII clathrate hydrates, SH clathrate hydrates, or combinations thereof. In embodiments, fluids capable of forming SI clathrate hydrates include at least one of methane, ethane, propane, butane, carbon dioxide, or hydrogen sulfide. In embodiments, fluids capable of forming SII clathrate hydrates include at least one of propane, butane, or pentane. In embodiments, SI clathrate hydrates and SII clathrate hydrates have crystalline cubic structures which are well known to one of ordinary skill in the art. In embodiments, SH clathrate hydrates have hexagonal structures which are well known to one of ordinary skill in the art. In further embodiments where the fluid capable of forming clathrate hydrates is capable of forming SI clathrate hydrates, SII clathrate hydrates, SH clathrate hydrates, or combinations thereof, the contacting is effective to inhibit or inhibits formation of SI clathrate hydrates, SII clathrate hydrates, SH clathrate hydrates, or combinations thereof.

In embodiments, the fluid is contacted with the at least one copolymer of General Formula (I) in an amount effective to inhibit clathrate hydrate formation. In specific embodiments, the fluid is contacted with from about 0.01 weight % to about 5 weight %, or from about 0.1 weight % to about 4 weight %, or from about 0.5 weight % to about 4 weight %, or about 2.5 weight % of the at least one copolymer of General Formula I. In embodiments, the weight % of the at least one copolymer of General Formula I refers to the weight % of the water cut. In embodiments, the at least one copolymer of General Formula (I) is water soluble.

As shown in FIG. 6, in embodiments, the fluid capable of forming the clathrate hydrates is contacted with the at least one copolymer of General Formula (I) at a tie-in-platform 10. As shown in FIG. 6, in embodiments, the tie-in-platform 10 is an offshore platform which is in fluidic communication with an onshore plant 100 via a pipeline 50. In embodiments, the tie-in-platform 10 is in fluidic communication with wellheads 200, 300, 400, 500, and 600, which provide an interface for drilling and production equipment. In embodiments, the fluid capable of forming the clathrate hydrates is flowing in a pipeline 50. In further embodiments, the fluid capable of forming the clathrate hydrates is flowing in pipeline 50 from an offshore site to an onshore site. In illustrative, non-limiting embodiments, the fluid capable of forming the clathrate hydrates is flowing in pipeline 50 from the tie-in-platform 10 to the onshore plant 100. In illustrative, non-limiting embodiments, the at least one copolymer of General Formula (I) is injected into the fluid capable of forming the clathrate hydrates at the tie-in-platform 10.

In embodiments, the tie-in-platform 10 includes a receptacle 15 for holding clathrate hydrate inhibitors and a clathrate hydrate inhibitor injection skid 20. In illustrative, non-limiting embodiments, the at least one copolymer of General Formula (I) is held in the receptacle 15 for holding clathrate hydrate inhibitors. In illustrative, non-limiting embodiments, the at least one copolymer of General Formula (I) is injected into the fluid capable of forming the clathrate hydrates via the clathrate hydrate inhibitor injection skid 20.

Embodiments of methods for inhibiting formation of clathrate hydrates using the succinimide-based copolymers having General Formula (I) have been described in detail.

EXAMPLES

The following non-limiting examples illustrate the synthesis of the copolymers having General Formula (I), and also illustrate methods of the present disclosure. The compounds synthesized should be understood to be illustrative in nature and in no regard limiting to the scope of General Formula (I) or of the methods described.

Example 1: Synthesis of Succinimide-Based Copolymers Having General Formula (I)

Materials and Methods.

Succinimide-based copolymers having General Formula (I) in which $R^1$ is —$(CH_2)_4$—, x is 0.5, and y is 0.5, were synthesized in accordance with the following reaction scheme:

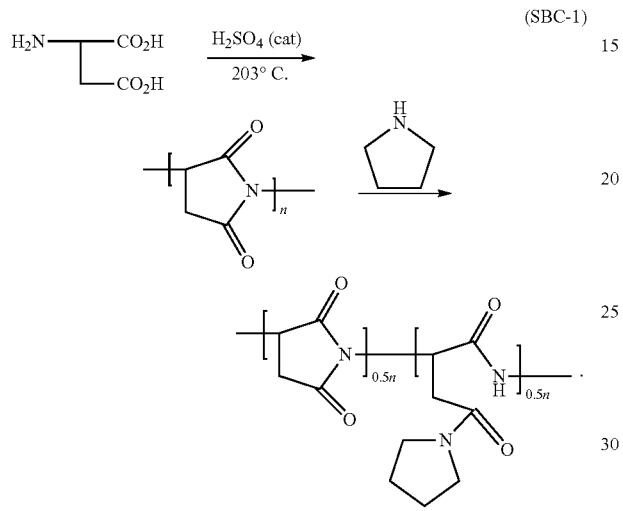

More specifically, succinimide-based copolymers having General Formula (I) were synthesized by grinding L-aspartic acid (about 66.5 g, 0.5 mol) with a mortar and pestle while adding concentrated $H_2SO_4$ (about 3.3 g) to the L-aspartic acid dropwise to form a grinded mixture. The grinded mixture was stirred in a round bottom flask using a magnetic stir-bar and heated via an oil bath at about 203° C. After 30 minutes, the grinded mixture was cooled to room temperature, grinded thoroughly, and heated under stirring again at about 203° C. using a silicone oil bath for 7 hours. The grinded mixture was then cooled to room temperature and filtered while washing with hot water (about 300 mL, 55° C.) and methanol (about 150 mL). The resultant polysuccinimide (that is, PSI), was dried under vacuum at about 70° C. to a constant weight (about 42 g, 90% yield).

A solution of about 0.5% PSI in dimethyl formamide (that is, DMF), had a reduced viscosity (that is, $\eta_{red}$) of about 8.57 mL/g as determined at about 25° C. using an Ubbelohde viscometer (viscometer constant K=0.005 $mm^2$ $s^{-2}$, SI Analytics, College Station, Tex., USA). The viscosity average molecular weight was estimated to be 9744 g/mol and the degree of polymerization (that is, n) was estimated to be 100. The degree of polymerization was calculated with the following empirical equation (1):

$$n = 3.52 \times \eta_{red}^{1.56} \quad (1)$$

where n is the degree of polymerization and $\eta_{red}$ is the reduced viscosity of a solution of 0.5% PSI in DMF expressed in units of mL/g.

After drying the PSI under vacuum at about 70° C., pyrollidine (50 mmol) was added dropwise to the dried PSI (about 9.7 g, 100 mL) in DMF (about 40 mL) at about 0° C. over a period of 5 minutes to form a reaction mixture. The reaction mixture was stirred at room temperature for 18 hours. The product of the reaction mixture was precipitated in acetone, filtered, and dried under vacuum at about 60° C. to a constant weight to obtain a succinimide-based copolymer of structure (SBC-1):

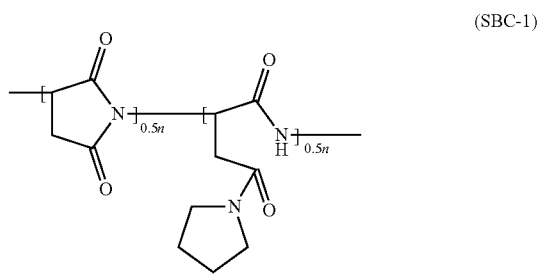

(Yield: about 90%). The succinimide-based copolymer of structure (SBC-1) was found to be soluble in water was well as methanol.

Results.

As determined via $^1H$ NMR spectroscopy in $D_2O$ and elemental analysis, the succinimide-based copolymer of structure (SBC-1) was found to include the intact succinimide ring and the opened ring in an approximate ratio of 1:1. For example, referencing FIG. 1, for an approximate ratio of 1:1 of the intact succinimide ring monomeric repeating unit and the opened ring monomeric repeating unit, the area under δ1.6-2.0 ppm would belong to the 4 hydrogen atoms marked f and would have an integrated area (A), the 2 hydrogen atoms marked d and the 4 hydrogen atoms marked e would have an integrated area (B) (where B=[A/4]*6), the 2 hydrogen atoms marked b would have an integrated area (C) which would be calculated as (D−[A/4]*6), where D represents the total area belonging to the hydrogen atoms marked b, d, and e under δ2.4-3.7 ppm, and where the mole ratio of the intact succinimide ring monomeric repeating unit and the opened ring monomeric repeating unit would be calculated as (C/2):(A/4) based on the ratio of a single hydrogen atom of the intact succinimide ring monomeric repeating unit and the opened ring monomeric repeating unit. Thus, the approximate ratio was confirmed to be 1.01:1.00. Additionally, the following elemental analysis was revealed: C: 53.0%; H: 5.2%, N: 15.2% (where an approximate ratio of 1:1 in the SBC-1 would require the following elemental analysis: 53.31%; H: 5.15%; N: 15.55%).

Example 2: Synthesis of Succinimide-Based Copolymers Having General Formula (I)

Materials and Methods.

Succinimide-based copolymers having General Formula (I) in which $R^1$ is —$(CH_2)_5$—, x is 0.5, and y is 0.5, were synthesized in accordance with the following reaction scheme:

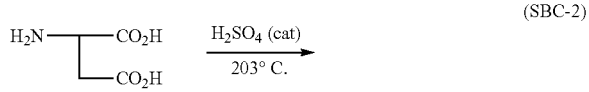

-continued

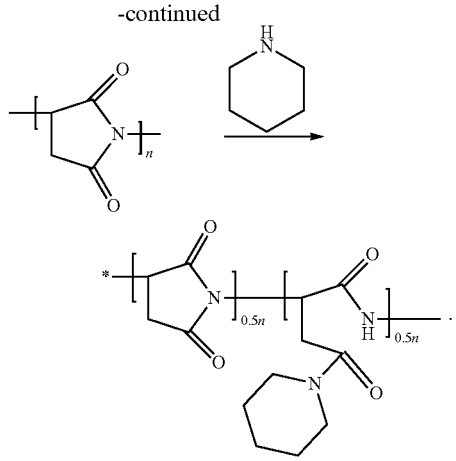

More specifically, succinimide-based copolymers having General Formula (I) were synthesized by grinding L-aspartic acid (about 66.5 g, 0.5 mol) with a mortar and pestle while adding concentrated $H_2SO_4$ (about 3.3 g) to the L-aspartic acid dropwise to form a grinded mixture. The grinded mixture was stirred in a round bottom flask using a magnetic stir-bar and heated via an oil bath at about 203° C. After 30 minutes, the grinded mixture was cooled to room temperature, grinded thoroughly, and heated under stirring again at about 203° C. using a silicone oil bath for 7 hours. The grinded mixture was then cooled to room temperature and filtered while washing with hot water (about 300 mL, 55° C.) and methanol (about 150 mL). The resultant PSI was dried under vacuum at about 70° C. to a constant weight (about 42 g, 90% yield).

A solution of about 0.5% PSI in DMF had a reduced viscosity of 8.57 mL/g as determined at 25° C. using an Ubbelohde viscometer (viscometer constant K=0.005 $mm^2$ $s^{-2}$, SI Analytics). The viscosity average molecular weight was estimated to be 9744 g/mol and the degree of polymerization was estimated to be 100. The degree of polymerization was calculated with the empirical equation (1), as in Example 1.

After drying the PSI under vacuum at about 70° C., piperidine (50 mmol) was added dropwise to the dried PSI (about 9.7 g, 100 mL) in DMF (about 40 mL) at 0° C. over a period of 5 minutes to form a reaction mixture. The reaction mixture was stirred at room temperature for 18 hours. The product of the reaction mixture was precipitated in acetone, filtered, and dried under vacuum at about 60° C. to a constant weight to obtain a succinimide-based copolymer of structure (SBC-2):

(SBC-2)

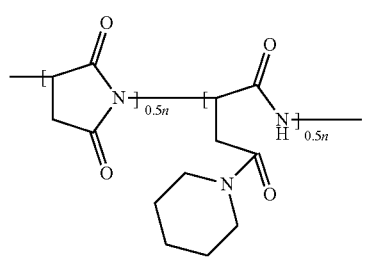

(Yield: about 90%). The succinimide-based copolymer of structure (SBC-2) was found to be soluble in water was well as methanol.

Results.

Figure 2:
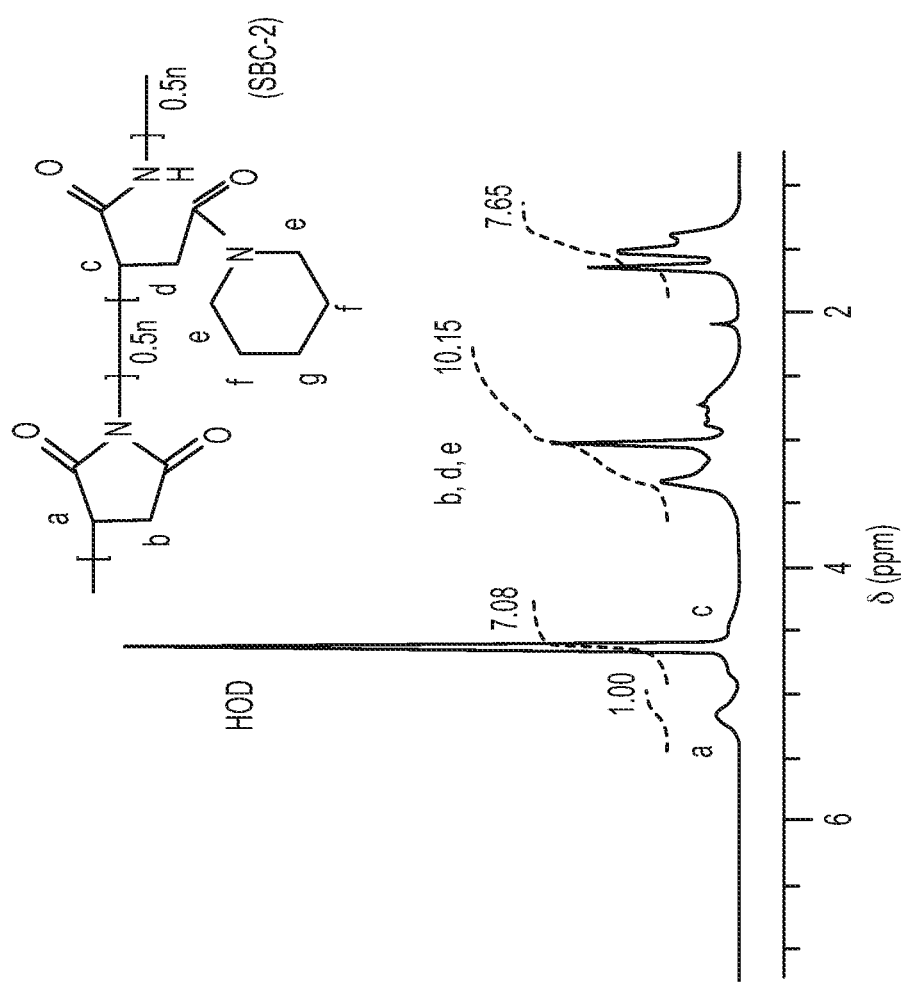
FIG. 2 is a resonance $^1$H NMR spectrum of succinimide-based copolymers having structure (SBC-2) as disclosed in Table 1, where Chemical Shift δ [ppm]=1.6-1.8 belongs to the 6 hydrogen atoms marked f and g and has an integrated area of (A), where the 2 hydrogen atoms marked d and the 4 hydrogen atoms marked e should have an integrated area equal to area A, where the 2 hydrogen atoms marked b should have an integrated area of (B) which would be calculated as (B=C−A), where C represents the total area belonging to the hydrogen atoms marked b, d, and e under δ2.3-3.6 ppm, and where the mole ratio of the monomeric repeating units is calculated as (B/2):(A/6), based on the ratio of a single hydrogen atom of the first and second monomeric repeating units.

As determined via $^1H$ NMR spectroscopy in $D_2O$ and elemental analysis, the succinimide-based copolymer of structure (SBC-2) was found to include the intact succinimide ring and the opened ring in an approximate ratio of 1:1. For example, referencing FIG. 2, for an approximate ratio of 1:1 of the intact succinimide ring monomeric repeating unit and the opened ring monomeric repeating unit, the area under δ1.6-1.8 ppm would belong to the 6 hydrogen atoms marked f and g and would have an integrated area (A), the 2 hydrogen atoms marked d and the 4 hydrogen atoms marked e would have an integrated area (B) (where B=[A/4]*6), the 2 hydrogen atoms marked b should have an integrated area equal to area A, where the 2 hydrogen atoms marked b should have an integrated area of (B) which would then be calculated as (B=C−A), where C represents the total area belonging to the hydrogen atoms marked b, d, and e under δ2.3-3.6 ppm, and where the mole ratio of the intact succinimide ring monomeric repeating unit and the opened ring monomeric repeating unit is calculated as (B/2):(A/6), based on the ratio of a single hydrogen atom of the intact succinimide ring monomeric repeating unit and opened ring monomeric repeating unit. Thus, the approximate ratio was confirmed to be 0.98:1.00. Additionally, the following elemental analysis was revealed: C: 54.0%; H: 5.5%, N: 14.6% (where an approximate ratio of 1:1 in the SBC-2 would require the following elemental analysis: C: 54.40%; H: 5.43%; N: 14.90%).

Example 3: Synthesis of Succinimide-Based Copolymers Having General Formula (I)

Materials and Methods.

Succinimide-based copolymers having General Formula (I) in which $R^1$ is —$(CH_2)_6$—, x is 0.5, and y is 0.5, were synthesized in accordance with the following reaction scheme:

(SBC-3)

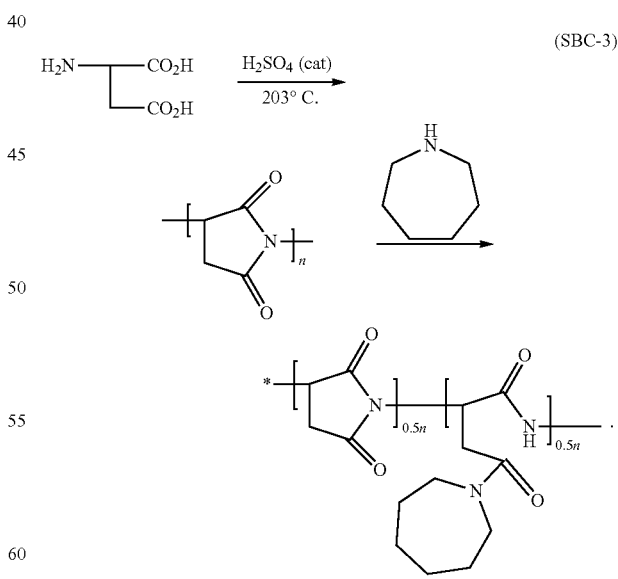

More specifically, succinimide-based copolymers having General Formula (I) were synthesized by grinding L-aspartic acid (about 66.5 g, 0.5 mol) with a mortar and pestle while adding concentrated $H_2SO_4$ (about 3.3 g) to the L-aspartic acid dropwise to form a grinded mixture. The grinded mixture was stirred in a round bottom flask using a magnetic stir-bar and heated via an oil bath at about 203° C. After 30 minutes, the grinded mixture was cooled to room temperature, grinded thoroughly, and heated under stirring again at about 203° C. using a silicone oil bath for 7 hours. The grinded mixture was then cooled to room temperature and filtered while washing with hot water (about 300 mL, 55° C.) and methanol (about 150 mL). The resultant PSI was dried under vacuum at 70° C. to a constant weight (about 42 g, 90% yield).

A solution of about 0.5% PSI in DMF had a reduced viscosity of 8.57 mL/g as determined at 25° C. using an Ubbelohde viscometer (viscometer constant K=0.005 mm$^2$ s$^{-2}$, SI Analytics). The viscosity average molecular weight was estimated to be 9744 g/mol and the degree of polymerization was estimated to be 100. The degree of polymerization was calculated with the empirical equation (1), as in Example 1.

After drying the PSI under vacuum at about 70° C., azepane (about 50 mmol) was added dropwise to the dried PSI (about 9.7 g, 100 mL) in DMF (about 40 mL) at 0° C. over a period of 5 minutes to form a reaction mixture. The reaction mixture was stirred at room temperature for 18 hours. The product of the reaction mixture was precipitated in acetone, filtered, and dried under vacuum at about 60° C. to a constant weight to obtain a succinimide-based copolymer of structure (SBC-3):

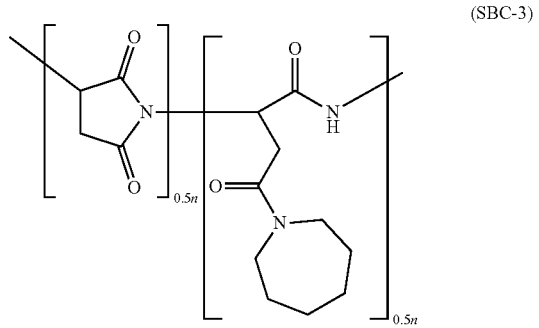

(SBC-3)

Yield: about 93%). The succinimide-based copolymer of structure (SBC-3) was found to be soluble in water as well as methanol.

Results.

Figure 3:
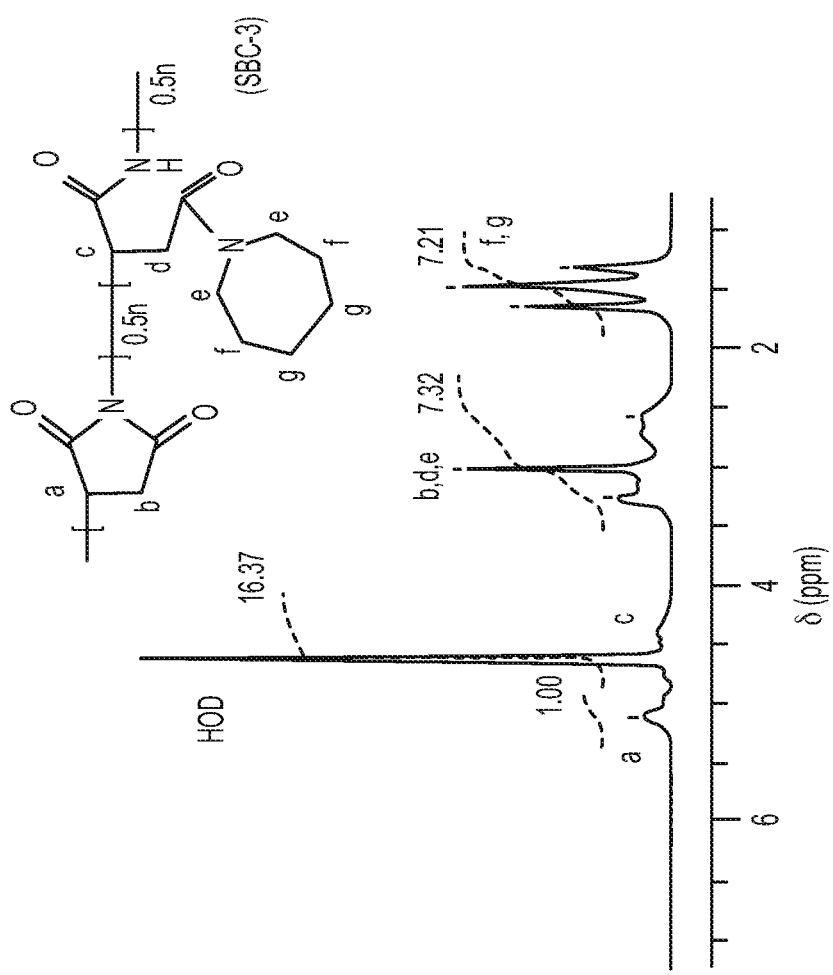
FIG. 3 is a $^1$H NMR spectrum of succinimide-based copolymers having structure (SBC-3) as disclosed in Table 1, where Chemical Shift δ [ppm]=1.2-1.7 ppm belongs to the 8 hydrogen atoms marked f and g and has an integrated area of (A), where the 2 hydrogen atoms marked d and the 4 hydrogen atoms marked e should have an integrated area (B) which would be calculated as (B=[A/8]*6), where the 2 hydrogen atoms marked b would have an integrated area of (C) which would then be calculated as (C=[D−B]), where D represents the total area belonging to the hydrogen atoms marked b, d, and e under δ2.3-3.5 ppm, and where the mole ratio of the monomeric repeating units is calculated as (C/2):(A/8), based on the ratio of a single hydrogen atom of the first and second monomeric repeating units.

As determined via $^1$H NMR spectroscopy in D$_2$O and elemental analysis, the succinimide-based copolymer of structure (SBC-3) was found to include the intact succinimide ring and the opened ring in an approximate ratio of 1:1. For example, referencing FIG. 3, for an approximate ratio of 1:1 of the intact succinimide ring monomeric repeating unit and the opened ring monomeric repeating unit, the area under δ1.2-1.7 ppm would belong to the 8 hydrogen atoms marked f and g and would have an integrated area (A), the 2 hydrogen atoms marked d and the 4 hydrogen atoms marked e should have an integrated area (B) which would be calculated as (B=[A/8]*6), the 2 hydrogen atoms marked b would have an integrated area of (C) which would be calculated as (C=[D−B]), where D represents the total area belonging to the hydrogen atoms marked b, d, and e under δ2.3-3.5 ppm, and where the mole ratio of the intact succinimide ring monomeric repeating unit and the opened ring monomeric repeating unit is calculated as (C/2):(A/8), based on the ratio of a single hydrogen atom of the intact succinimide ring monomeric repeating unit and opened ring monomeric repeating unit. Thus, the approximate ratio was confirmed to be 1.06:1.00. Additionally, the following elemental analysis was revealed: C: 55.0%; H: 5.6%, N: 14.1% (where an approximate ratio of 1:1 in the SBC-3 would require the following elemental analysis: C: 55.35%; H: 5.67%; N: 14.35%).

Example 4: Characterization of Polyacrylamide-Co-Acrylic Acid and Poly-Ethyl-Oxazoline Inhibition of Clathrate Hydrate Formation Materials and Methods.

Polyacrylamide-co-acrylic acid (that is, PAC-AA) sodium salt with about 70% carboxyl high carbonyl and a molecular weight of about 200,000 (Polysciences, Warrington, Pa., USA) and poly-ethyl-oxazoline (PEOx) (Sigma-Aldrich Corp. St. Louis, Mo., USA; CAS Number: 25805-17-8) were obtained commercially. The ability of PAC-AA and PEOx to inhibit clathrate hydrate formation was characterized. More specifically, Rocking Cells (that is, RC-5) were employed to characterize the ability of PAC-AA and PEOx to inhibit clathrate hydrate formation. The RC-5 included five Hastelloy cells (PSL Systemtechnik Gmbh, Osterode am Harz, Germany) capable of operating under high pressure (that is, up to 200 bars) and in sour gas conditions. The five Hastelloy cells of the RC-5 were immersed in a temperature controlled bath containing ethylene glycol and water. During operation, the RC-5 was rocked to achieve mixing of the reactant slurry. The volume of the Hastelloy cell with a mixing ball was about 30 mL. The RC-5 enabled formation of natural gas clathrate hydrates under simulated operating conditions to test the effectiveness of the PAC-AA and PEOx. Data acquisition was completed with WinRC software to measure the pressure and temperature with time in each of the five Hastelloy cells.

In a typical run, each of the five Hastelloy cells was charged with about 10 mL of a polymer formulation. Specifically, the 10 mL polymer formulation included polymers, such as, PAC-AA, PEOx, or succinimide-based copolymers, (about 3 weight %), a solvent (about 0.195 grams, that is grams, monoethylene glycol, that is MEG), and brine (about 97 weight %, 9.7 g), as set forth in Table 2. Then, the five Hastelloy cells were charged with a natural gas for one hour until equilibrium was reached, as described in Table 3, that is, a natural gas was added to the five Hastelloy cells, to a pressure of about 70 bars and 21° C. The brine included an aqueous solution of chloride anions, sodium cations, acetic acid, formic acid, and conjugate bases as set forth in Table 2:

TABLE 2

| Brine | | |
|---|---|---|
| Ion/Molecular Formula | Common Name | Concentration (mg/L) |
| Cl$^-$ | Chloride Anions | 607 |
| Na$^+$ | Sodium Cations | 393 |
| CH$_3$COOH | Acetic Acid | 500 |
| HCOOH | Formic Acid | 250 |

Because natural gas in the field contains large amounts of methane, carbon dioxide, hydrogen sulfide, and nitrogen and also contains small amounts of ethane, propane, and butane, to simulate pipeline operating conditions in the field, a natural gas composition as set forth in Table 3 was employed:

TABLE 3

Natural Gas Composition

| Molecular Formula | Common Name | Mole % |
|---|---|---|
| $CH_4$ | Methane | 79.6 |
| $C_2H_6$ | Ethane | 1.4 |
| $C_3H_8$ | Propane | 0.2 |
| $C_4H_{10}$ | Butane | 0.1 |
| $CO_2$ | Carbon Dioxide | 9.2 |
| $H_2S$ | Hydrogen Sulfide | 2.3 |
| $N_2$ | Nitrogen | 7.2 |

In this specific Example, each of the five Hastelloy cells were charged with 10 mL of a polymer formulation including PAC-AA or PEOx (about 3 weight %) and the brine (about 97 weight %) of Table 2. PAC-AA and PEOx were tested separately, that is, two different polymers were not paired together in a single test. Then, the five Hastelloy cells were charged with a natural gas, as described in Table 3, to a pressure of about 70 bars at 21° C. Referencing FIG. 4, the RC-5 was then programmed to change temperature at three operation stages as set forth generally in Table 4:

TABLE 4

Programmed Temperature Stages in the RC-5 - Program 1

| Stage | Start Temp (° C.) | Average Ramp (° C./min) | $T_{sc}$ (° C./min) | Duration (min) |
|---|---|---|---|---|
| 1 | 14.6 | 0.1 | 4.0 | 7000 |
| 2 | 13 | 0.1 | 5.6 | 1500 (from 7000 to 8500) |
| 3 | 8.1 | 0.08 | 10.5 | 2500 (from 8500 to 11000) |

The three-phase equilibrium temperature (that is, liquid, vapor, and hydrate) of clathrate hydrates in the natural gas composition of Table 3 was calculated via methods known to those of ordinary skill in the art. The three-phase equilibrium temperature of clathrate hydrates in the natural gas composition was found to be about 18.6° C. at 70 bars. Moreover, the pressure changes for liquid, vapor, and hydrate phases were accounted for by employing a mass balance of the natural gas composition so that pressure changes were accurately attributed to clathrate hydrate formation.

The ability of PAC-AA and PEOx to inhibit clathrate hydrate formation was evaluated at three subcooling temperatures: about 4.0° C., 5.6° C., and 10.5° C. The ability of PAC-AA and PEOx to inhibit clathrate hydrate formation was evaluated at three subcooling temperatures to determine the induction period and the temperature at which clathrate hydrate formation occurred. More specifically, in embodiments, the ability of succinimide-based copolymers to inhibit clathrate hydrate formation was evaluated by assessing the pressure during each of the operation stages at the various subcooling temperatures, where a stable pressure was determined to be indicative of clathrate hydrate inhibition.

Results.

Figure 4:
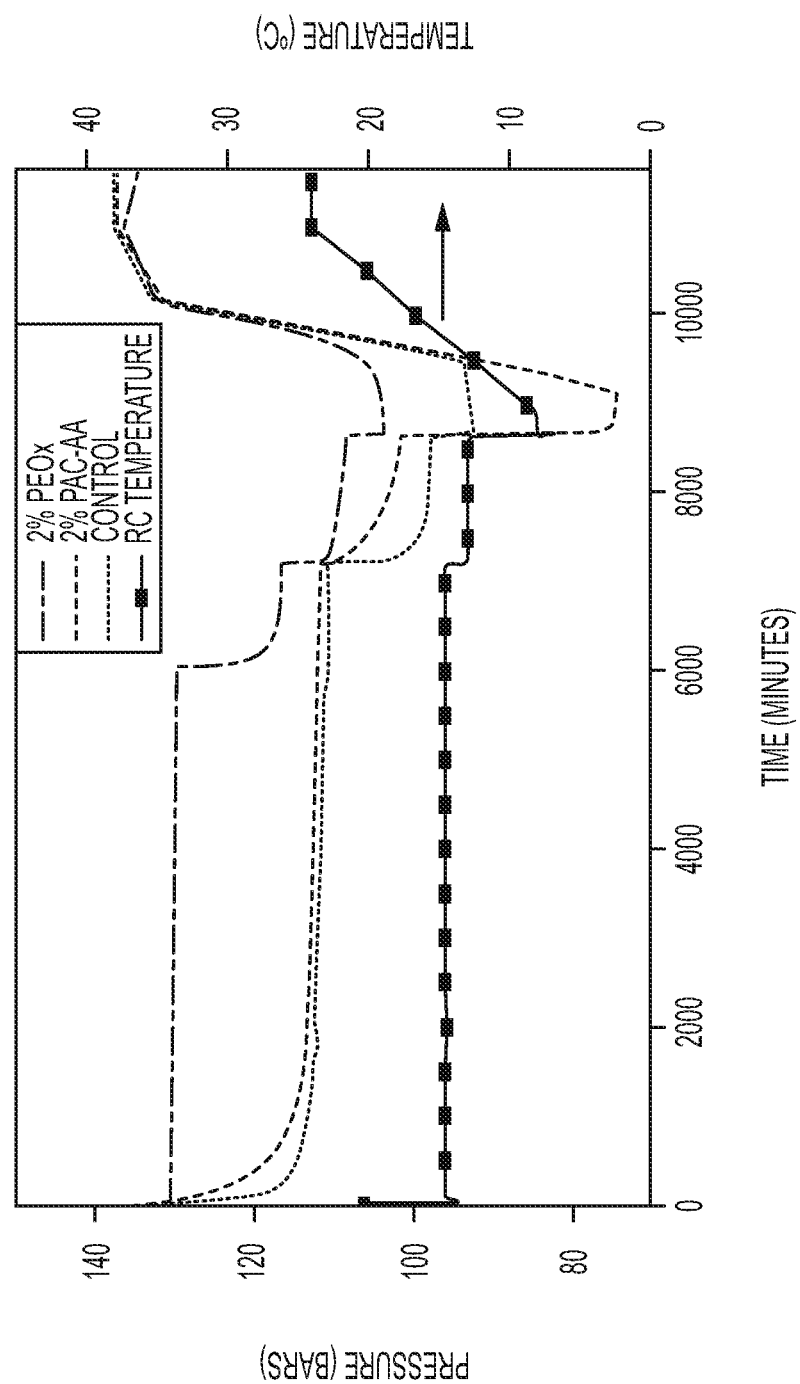
FIG. 4 is a graph of Time (Minutes) with respect to Pressure (Bars) of a 2% poly-ethyl-oxazoline (that is, 2% PEOx) composition, a 2% polyacrylamide-co-acrylic acid (that is, 2% PAC-AA) composition, and Brine as disclosed in Table 2 (that is, Control).

As shown in FIG. 4, PAC-AA and PEOx were not effective inhibitors of clathrate hydrate formation at any subcooling temperatures. Clathrate hydrate formation was instantaneous in RC-5 charged with PAC-AA and the brine water composition of Table 2. While PEOx delayed nucleation of clathrate hydrates, PEOx eventually failed as a clathrate hydrate formation inhibitor at a first subcooling temperature of 4.0° C. In addition, clathrate hydrate growth was very rapid in RC-5 cells charged with PEOx.

Example 5: Characterization of Succinimide-Based Copolymers' (SBC-1), (SBC-2) and (SBC-3) and Sodium Polyaspartate-Ran-Polysuccinimide Inhibition of Clathrate Hydrate Formation Materials and Methods.

Succinimide-based copolymers having structures (SBC-1), (SBC-2) and (SBC-3) were synthesized as in Examples 1-3. Additionally, sodium polyaspartate-ran-polysuccinimide (that is, SBC-4) was synthesized:

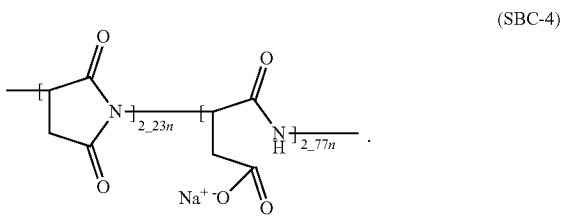

(SBC-4)

More specifically, SBC-4 was synthesized by adding solid NaOH (about 3.17 g, 79.3 mmol, that is 0.77 molar fraction of repeating units) portion-wise to PSI (about 10.0 g, 103 mmol related to repeating units) in water (about 30 mL) at about 0° C. over a period of 5 to 8 minutes under $N_2$ with stirring to form a reaction mixture. PSI was synthesized as in Example 1. The reaction mixture was stirred at room temperature for 3 hours. The reaction mixture was added drop-wise into acetone (about 200 mL) with stirring. A hygroscopic white reaction product was filtered, washed with acetone, and dried under vacuum at about 70° C. to a constant weight to obtain SBC-4. (Yield: about 88%).

The ability of (SBC-1), (SBC-2), (SBC-3), and (SBC-4) to inhibit clathrate hydrate formation was characterized as in Example 4, except that the RC-5 was programmed to change temperature at three operation stages as set forth generally in Table 5. Additionally, each succinimide-based copolymer was tested separately, that is, two different succinimide-based copolymers were not paired together in a single test.

TABLE 5

Programmed Temperature Stages in the RC-5 - Program 2

| Stage | Start Temp (° C.) | Average Ramp (° C./min) | $T_{sc}$ (° C./min) | Duration (min) |
|---|---|---|---|---|
| 1 | 14.6 | 0.1 | 4.0 | 1450 to 7000 |
| 2 | 13 | 0.1 | 5.6 | 1450 |
| 3 | 8.1 | 0.08 | 10.5 | 180 |

Results.

Figure 5:
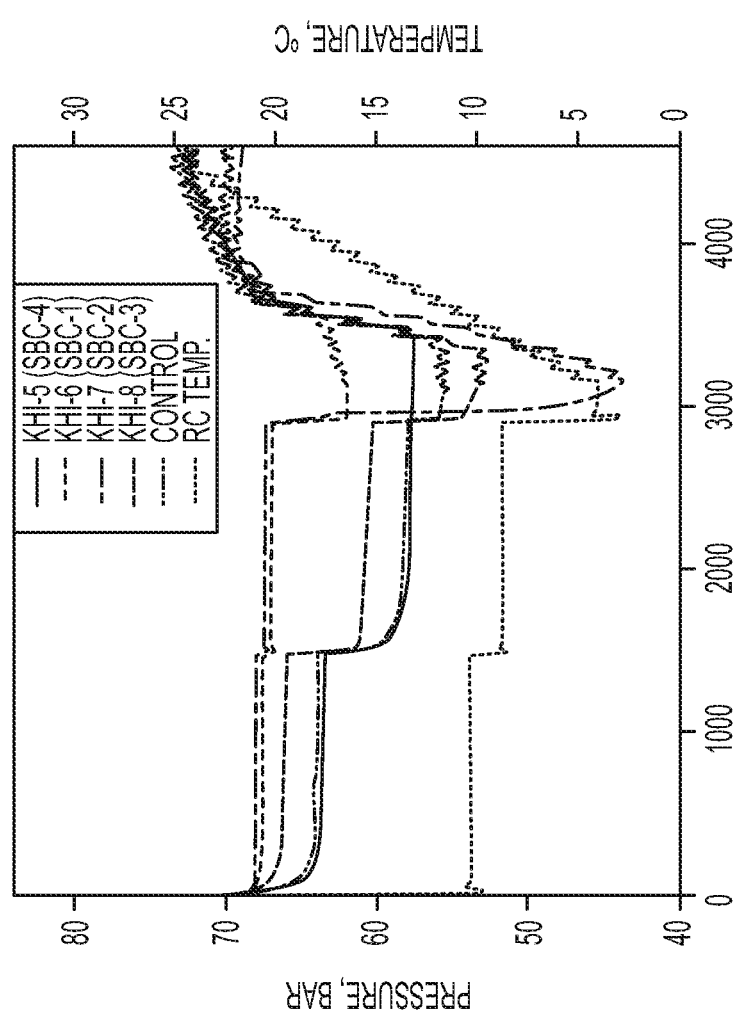
FIG. 5 is a graph of Time (Minutes) with respect to Pressure (Bar) of succinimide-based copolymers having structures (SBC-4) (that is, KHI-5), (SBC-1) (that is, KHI-6), (SBC-2) (that is, KHI-7), and (SBC-3) (that is KHI-8) as disclosed in Table 1, and Brine as disclosed in Table 2 (that is, Control).

As shown in FIG. 5, the succinimide-based copolymers having structures (SBC-1) and (SBC-2) were effective inhibitors of clathrate hydrate formation at both a first subcooling temperature of 4.0° C. and a second subcooling temperature of 5.6° C. Moreover, succinimide-based copolymers having structures (SBC-1) and (SBC-2) were able to delay nucleation of clathrate hydrates at a subcooling temperature of 6.0° C. for more than two days. Further, succinimide-based copolymers having structures (SBC-1) and (SBC-2) were effective to prevent clathrate hydrate formation in a pipeline in the field at a second subcooling temperature of 5.6° C. Additionally, (SBC-3) and (SBC-4)

were effective to prevent clathrate hydrate formation at a first subcooling temperature of 4.0° C. Moreover, in view of the pressure changes of FIG. 5, (SBC-3) was more effective than (SBC-4) to prevent clathrate hydrate formation at a first subcooling temperature of 4.0° C.

It will be apparent to those skilled in the art that various modifications and variations can be made to the embodiments described in this disclosure without departing from the spirit and scope of the claimed subject matter. Thus it is intended that this disclosure cover the modifications and variations of the various embodiments described provided such modifications and variations come within the scope of the appended claims and their equivalents.

It is noted that terms like "generally," "commonly," and "typically" are not utilized to limit the scope of the claims or to imply that certain features are critical, essential, or even important to the structure or function of the claims. Rather, these terms are merely intended to highlight alternative or additional features that may or may not be utilized in a particular embodiment of the present disclosure.

It is to be further understood that where descriptions of various embodiments use the term "comprising," or "including" those skilled in the art would understand that in some specific instances, an embodiment can be alternatively described using language "consisting essentially of" or "consisting of."

Unless otherwise indicated, all numbers expressing quantities of ingredients, properties such as reaction conditions, and so forth used in the disclosure and claims are to be understood as being modified in all instances by the term "about." Accordingly, unless indicated to the contrary, the numerical parameters set forth in this disclosure and claims are approximations that can vary depending upon the desired properties sought to be obtained by the presently-disclosed subject matter.

It should be understood that every maximum numerical limitation given throughout this disclosure includes every lesser numerical limitation, as if such lesser numerical limitations were expressly written in this disclosure. Every minimum numerical limitation given throughout this disclosure will include every greater numerical limitation, as if such greater numerical limitations were expressly written in this disclosure. Every numerical range given throughout this disclosure will include every narrower numerical range that falls within such broader numerical range, as if such narrower numerical ranges were all expressly written in this disclosure.

Unless otherwise defined, all technical and scientific terms used in this disclosure have the same meaning as commonly understood by one of ordinary skill in the art to which the claimed subject matter belongs. The terminology used in this disclosure is for describing particular embodiments only and is not intended to be limiting. As used in the disclosure and appended claims, the singular forms "a," "an," and "the" are intended to include the plural forms as well, unless the context clearly indicates otherwise.

What is claimed is:

1. A method for inhibiting formation of clathrate hydrates in a fluid capable of forming the clathrate hydrates, the method comprising:
   contacting the fluid with at least one bipolymer of General Formula (I) under conditions suitable for forming the clathrate hydrates:

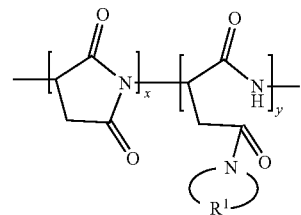

in which:
   $R^1$ is chosen from divalent $C_5$-$C_7$ aliphatic groups or divalent $C_5$-$C_7$ heteroaliphatic groups, optionally substituted with one or more $C_1$-$C_6$ aliphatic groups, heteroatoms independently chosen from O, N, or S, or combinations thereof, where:
      the divalent $C_5$-$C_7$ heteroaliphatic groups comprise one or two heteroatoms independently chosen from O, N, or S, and
      the maximum number of heteroatoms in $R^1$ is two;
   x is a molar fraction range chosen from 0.15 to 0.85; and
   y is a molar fraction range chosen from 0.15 to 0.85, where the summation of x and y equals 1.

2. The method of claim 1, where the fluid comprises water host molecules and natural gas guest molecules chosen from methane, ethane, propane, butane, pentane, carbon dioxide, hydrogen sulfide, nitrogen, condensate thereof, or combinations thereof.

3. The method of claim 1, where:
   the clathrate hydrates comprise SI clathrate hydrates, SII clathrate hydrates, SH clathrate hydrates, or combinations thereof, and
   the contacting inhibits formation of the SI clathrate hydrates, the SII clathrate hydrates, the SH clathrate hydrates, or the combinations thereof.

4. The method of claim 1, where the contacting inhibits the formation of the clathrate hydrates at a first subcooling temperature of from 0° C. to 4.0° C.

5. The method of claim 1, where the contacting inhibits the formation of the clathrate hydrates at a second subcooling temperature of from 4.0° C. to 10.0° C.

6. The method of claim 1, where the contacting inhibits the formation of the clathrate hydrates in a pressure range of from 40 bars to 200 bars.

7. The method of claim 1, where the fluid is contacted with a composition comprising the at least one bipolymer of General Formula (I) and one or more corrosion inhibitors, scale inhibitors, thermodynamic hydrate inhibitors, low dose hydrate inhibitors, anti-agglomerates, solvents, or combinations thereof.

8. The method of claim 1, where:

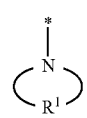

is chosen from
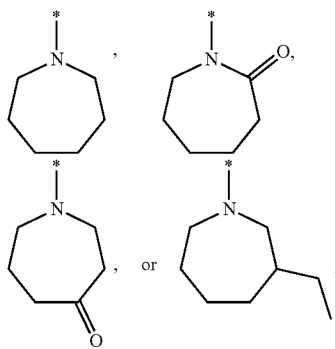
9. The method of claim 1, where the fluid is contacted with the at least one bipolymer at a tie-in platform.
10. The method of claim 1, where the fluid is flowing in a pipeline.
11. The method of claim 1, where:
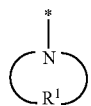
is chosen from
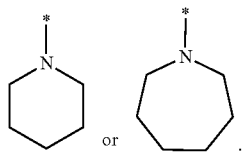
12. The method of claim 11, wherein x is a molar fraction of about 0.5; and y is a molar fraction of about 0.5.
* * * * *